(12) United States Patent
Kim et al.

(10) Patent No.: US 11,720,927 B2
(45) Date of Patent: Aug. 8, 2023

(54) METHOD AND APPARATUS FOR GENERATING USER-AD MATCHING LIST FOR ONLINE ADVERTISEMENT

(71) Applicant: Samsung Electronics Co., Ltd., Suwon-si (KR)

(72) Inventors: Junbeom Kim, Suwon-si (KR); Kimin Oh, Suwon-si (KR); Taeho Hwang, Suwon-si (KR); Kiwon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/526,421

(22) Filed: Nov. 15, 2021

(65) Prior Publication Data

US 2022/0222712 A1 Jul. 14, 2022

Related U.S. Application Data

(63) Continuation of application No. PCT/KR2021/013935, filed on Oct. 8, 2021.

(30) Foreign Application Priority Data

Jan. 13, 2021 (KR) .......................... 10-2021-0004930

(51) Int. Cl.
*G06Q 30/02* (2023.01)
*G06Q 30/0251* (2023.01)
(Continued)

(52) U.S. Cl.
CPC ......... *G06Q 30/0271* (2013.01); *G06N 3/045* (2023.01); *G06Q 30/0255* (2013.01); *G06Q 30/0277* (2013.01)

(58) Field of Classification Search
CPC ....................................... G06Q 30/0207–0277
See application file for complete search history.

(56) References Cited

U.S. PATENT DOCUMENTS

| | | | | |
|---|---|---|---|---|
| 6,983,311 B1 * | 1/2006 | Haitsuka | ................ | G06Q 10/02 707/999.102 |
| 7,072,863 B1 * | 7/2006 | Phillips | ................... | H04L 47/70 703/2 |

(Continued)

FOREIGN PATENT DOCUMENTS

| | | | | |
|---|---|---|---|---|
| CN | 202010166212 | * | 3/2020 | ......... G06F 16/9535 |
| KR | 2009-0058365 | * | 6/2009 | ......... G06Q 30/0271 |

(Continued)

OTHER PUBLICATIONS

International Search Report dated Jan. 12, 2022, issued in International Application No. PCT/KR2021/013935.

*Primary Examiner* — David J Stoltenberg
(74) *Attorney, Agent, or Firm* — Jefferson IP Law, LLP

(57) ABSTRACT

A server and a method for generating a user-advertisement (user-ad) matching list for online advertisement is provided. The method includes obtaining profile information and advertisement exposure history information of users exposed to a plurality of advertisements through an ad impression server, obtaining advertisement information of an advertisement to be delivered by an advertiser, identifying candidate users for the advertisement of the advertiser among the users, based on the profile information of the users, predicting an access time when the candidate users will access the ad impression server, selecting target users to be provided with the advertisement of the advertiser among the candidate users, based on the predicted access time, obtaining a preference of each target user for an advertisement product of the advertiser, and generating the user-ad (Continued)

matching list by matching the advertisement of the advertiser with the target users, based on the preference.

18 Claims, 15 Drawing Sheets

(51) Int. Cl.
    *G06Q 30/0241*     (2023.01)
    *G06N 3/045*     (2023.01)

(56) References Cited

U.S. PATENT DOCUMENTS

| | | | | |
|---|---|---|---|---|
| 8,175,914 | B1* | 5/2012 | Benson | G06Q 10/025 |
| | | | | 705/41 |
| 8,965,786 | B1* | 2/2015 | Frumkin | G06Q 30/0242 |
| | | | | 705/14.6 |
| 9,053,492 | B1* | 6/2015 | Stanley | G06Q 30/0224 |
| 2006/0294084 | A1* | 12/2006 | Patel | G06Q 30/02 |
| 2007/0027865 | A1* | 2/2007 | Bartz | G06F 40/30 |
| | | | | 707/999.005 |
| 2007/0112840 | A1* | 5/2007 | Carson | G06Q 30/02 |
| | | | | 707/999.102 |
| 2007/0179846 | A1* | 8/2007 | Jain | G06Q 30/0263 |
| | | | | 705/14.69 |
| 2008/0249832 | A1* | 10/2008 | Richardson | G06Q 30/02 |
| | | | | 705/14.54 |
| 2010/0057687 | A1* | 3/2010 | Shen | G06Q 30/0241 |
| 2011/0231248 | A1* | 9/2011 | Vee | G06Q 30/0246 |
| | | | | 705/14.45 |
| 2012/0166267 | A1* | 6/2012 | Beatty | G06Q 30/0219 |
| | | | | 705/14.46 |
| 2012/0278179 | A1* | 11/2012 | Campbell | G06Q 30/0255 |
| | | | | 705/14.69 |
| 2013/0211912 | A1 | 8/2013 | Kim et al. | |
| 2014/0006141 | A1* | 1/2014 | Vassilvitskii | G06Q 30/0275 |
| | | | | 705/14.71 |
| 2014/0279026 | A1* | 9/2014 | Nath | G06Q 30/0254 |
| | | | | 705/14.64 |
| 2016/0162934 | A1* | 6/2016 | Sega | H04L 67/53 |
| | | | | 705/14.46 |
| 2016/0239871 | A1 | 8/2016 | Yu et al. | |
| 2017/0169475 | A1* | 6/2017 | Korpusik | G06Q 30/0269 |
| 2017/0186029 | A1 | 6/2017 | Morris et al. | |
| 2018/0322398 | A1* | 11/2018 | Mbale | G06K 9/6296 |
| 2019/0087509 | A1* | 3/2019 | Tago | G06N 3/084 |
| 2020/0007934 | A1* | 1/2020 | Ortiz | H04N 21/23424 |
| 2020/0273062 | A1* | 8/2020 | Probell | G06Q 30/0255 |
| 2021/0049441 | A1* | 2/2021 | Bronstein | G06N 3/08 |
| 2021/0065011 | A1* | 3/2021 | Liu | G06N 3/0454 |
| 2021/0073671 | A1* | 3/2021 | Puri | G06N 20/00 |
| 2021/0133800 | A1 | 5/2021 | Andreou | |

FOREIGN PATENT DOCUMENTS

| | | |
|---|---|---|
| KR | 10-2013-0092500 A | 8/2013 |
| KR | 10-2016-0101530 A | 8/2016 |
| KR | 10-2018-0072166 A | 6/2018 |
| KR | 10-1914372 B1 | 12/2018 |
| KR | 10-2019-0012894 A | 2/2019 |
| KR | 10-2020-0002990 A | 1/2020 |
| KR | 10-2020-0142489 A | 12/2020 |

\* cited by examiner

| ADVERTISEMENT IMPRESSION HISTORY INFORMATION OBTAINED FROM AD IMPRESSION SERVER ||||
|---|---|---|---|
| Ad ID | User ID | IsClick | Date (YYYY-MM-DD H:MM:SS) |
| 1 | 25 | 0 | 2020-09-13 12:01:07 |
| 2 | 3 | 1 | 2020-09-13 12:01:12 |
| 3 | 23 | 0 | 2020-09-13 12:03:14 |
| ... | ... | ... | ... |
| K | 11 | 0 | 2020-09-13 12:06:25 |

420

| ADVERTISEMENT INFORMATION OF ADVERTISERS ||||
|---|---|---|---|
| Ad ID | Company | Category | Product |
| 1 | A | Shoes | ... |
| 2 | B | Car | ... |
| 3 | C | Food | ... |
| ... | ... | ... | ... |
| K | ... | Mobile device | ... |

430

| PROFILE INFORMATION OF USERS OBTAINED FROM AD IMPRESSION SERVER ||||
|---|---|---|---|
| User ID | Age | Gender | ... |
| 1 | 20 | F | ... |
| 2 | 34 | M | ... |
| 3 | 40 | M | ... |
| ... | ... | ... | ... |
| M | 31 | F | ... |

FIG. 10B

PREFERENCE OF SECOND USER BY ADVERTISEMENT

| User ID | Ad ID | Preference | ADVERTISEMENT TIME SLOT |
|---|---|---|---|
| 2 | 3 | 98 | 13:00–15:00 |
| | 13 | 90 | 12:00–15:00 |
| | 5 | 85 | 13:00–15:00 |
| | 15 | 81 | 12:00–14:00 |
| | 30 | 75 | 12:00–15:00 |
| | 36 | 74 | 12:00–13:00 |
| | ... | ... | ... |

1020

USER-AD MATCHING LIST

| | ADVERTISEMENT CANDIDATE FOR EACH TIME SLOT | | | |
|---|---|---|---|---|
| User ID | 2020-09-13 12:00 | 2020-09-13 13:00 | 2020-09-13 14:00 | YYYY-MM-DD H:MM |
| 1 | {6} | {6, 9} | {9} | ... |
| 2 | {13, 15, 30, 36, ...} | {3, 13, 5, 15, 30, ...} | {3, 13, 5, 30, ...} | ... |
| 3 | {4} | {7, 4, 8} | {4} | ... |
| ... | ... | ... | ... | ... |
| M | {1, 10, 7} | {8, 5, 10, 7, ...} | {8, 5, 7} | ... |

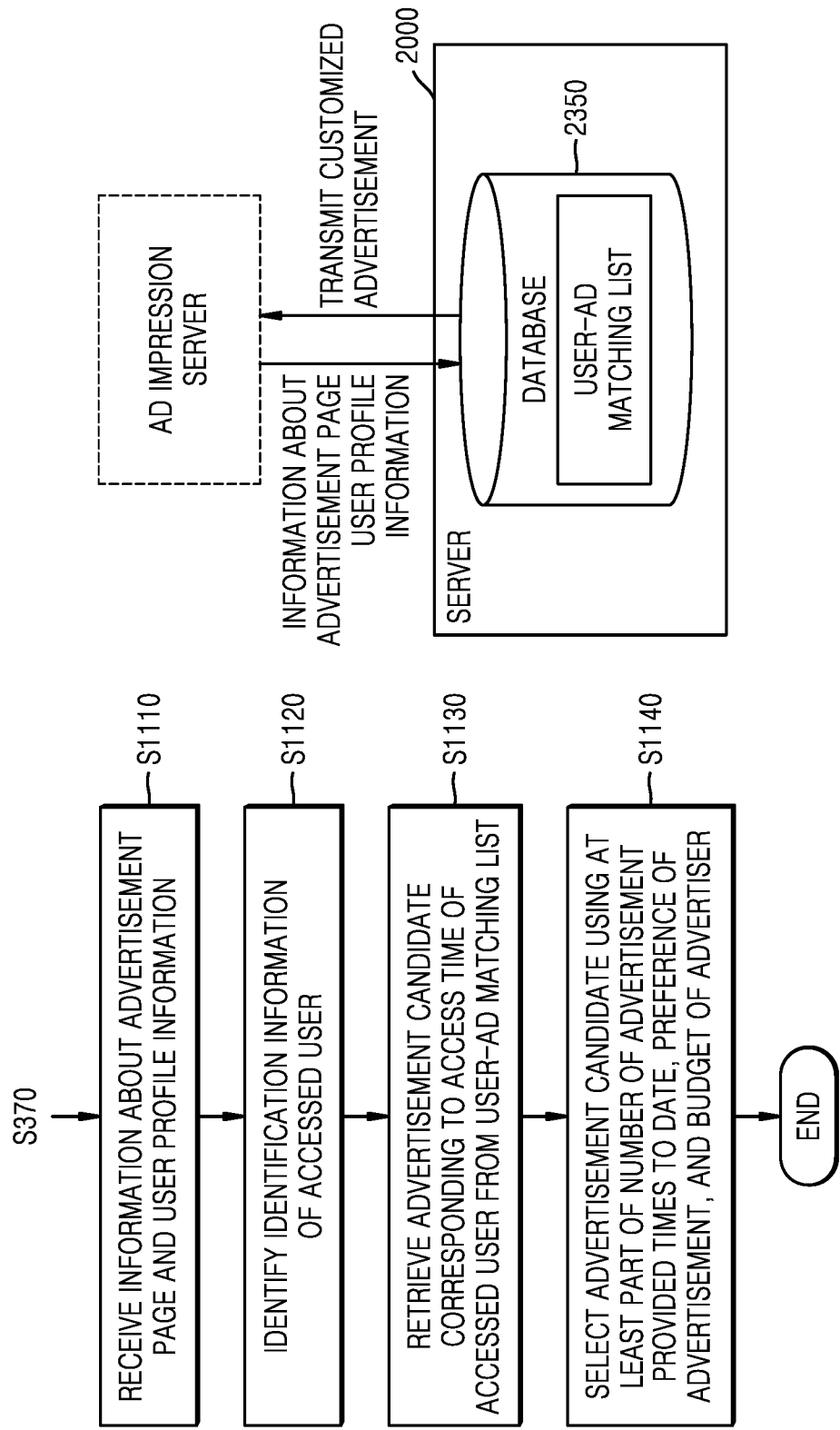

METHOD AND APPARATUS FOR GENERATING USER-AD MATCHING LIST FOR ONLINE ADVERTISEMENT

CROSS-REFERENCE TO RELATED APPLICATION(S)

This application is a continuation application, claiming priority under § 365(c), of an International application No. PCT/KR2021/013935, filed on Oct. 8, 2021, which is based on and claims the benefit of a Korean patent application number 10-2021-0004930, filed on Jan. 13, 2021, in the Korean Intellectual Property Office, the disclosure of which is incorporated by reference herein in its entirety.

TECHNICAL FIELD

The disclosure relates to a method and an apparatus for generating a user-advertisement (user-ad) matching list for online advertisement.

BACKGROUND ART

With the development of multimedia technology and network technology, users have been able to receive various online contents on various online media. In addition, as the users use services provided by online media, technology for transaction of online advertisements exposed to the users accessing online media has been developed.

The transaction of online advertisements may be accomplished by reception of an advertisement request to display an advertisement in an advertisement space to be exposed to the user from the online medium when the user accesses an online medium, participation of a plurality of advertisers in response to the received advertisement request to purchase the advertisement space of the online medium, and an advertiser winning a bid for the advertisement space in the online medium.

However, after the user accesses online media, searching for and selecting advertisements that fit the user's profile are performed within a short time, resulting in the advertiser's advertisement not being exposed to the optimal user for the advertisement, and the users may also have problems receiving advertisements not preferred by the users.

Accordingly, to seamlessly expose online content and advertisements to the user when the user accesses online media, a technology for selecting an advertisement to be exposed to the user and responding to the advertisement request sent from online media within a short time is required.

The above information is presented as background information only to assist with an understanding of the disclosure. No determination has been made, and no assertion is made, as to whether any of the above might be applicable as prior art with regard to the disclosure.

DESCRIPTION OF EMBODIMENTS

Technical Problem

Aspects of the disclosure are to address at least the above-mentioned problems and/or disadvantages and to provide at least the advantages described below. Accordingly, an aspect of the disclosure is to provide an apparatus capable of predicting future access time based on a user's past access history, identifying target users for an advertisement of an advertiser based on the predicted access time and advertisement information obtained from the advertiser, obtaining preferences of the target users for the advertisement, and generating a user-advertisement (user-ad) matching list wherein a plurality of users are matched with a plurality of advertisements based on the preferences.

Additional aspects will be set forth in part in the description which follows and, in part, will be apparent from the description, or may be learned by practice of the presented embodiments.

Technical Solution to Problem

In accordance with an aspect of the disclosure, a method, performed by a server, of generating a user-advertisement (user-ad) matching list for online advertisement is provided. The method includes obtaining, from an ad impression server, profile information and advertisement impression history information of users exposed to a plurality of advertisements through the ad impression server, obtaining, from the advertiser, advertisement information of an advertisement to be delivered by the advertiser, identifying candidate users for the advertisement of the advertiser among the users, based on the profile information of the users, predicting an access time when the candidate users will access the ad impression server by inputting the profile information of the candidate users and the advertisement exposure history information to a first artificial intelligence model, selecting target users to be provided with the advertisement of the advertiser among the candidate users, based on the predicted access time, obtaining a preference of each target user for an advertisement product of the advertiser by inputting the profile information of the target users, the advertisement exposure history information, and the advertisement information to the second artificial intelligence model, and generating the user-ad matching list by matching the advertisement of the advertiser with the target users, based on the preference.

In accordance with another aspect of the disclosure, a server generating a user-ad matching list for online advertisement is provided. The server includes a communicator configured to perform data communication with an ad impression server, a storage storing a program including one or more instructions, and a processor configured to execute the one or more instructions of the program stored in the storage, wherein the processor is configured execute the one or more instructions stored in the storage to control the communicator to obtain, from the ad impression server, profile information and advertisement exposure history information of users exposed to a plurality of advertisements through the ad impression server, obtain, from the advertiser, advertisement information of an advertisement to be delivered by the advertiser, identify candidate users for the advertisement of the advertiser among the users based on the profile information of the users, predict an access time when the candidate users will access the ad impression server by inputting the profile information and the advertisement exposure history information of the candidate users to a first artificial intelligence model, select target users to be provided with the advertisement of the advertiser among the candidate users, based on the predicted access time, obtain a preference of each target user for an advertisement product of the advertiser by inputting the profile information of the target users, the advertisement exposure history information, and the advertisement information to the second artificial intelligence model, and generate the user-ad matching list by matching the advertisement of the advertiser with the target users based on the preference.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIG. 4 is a diagram illustrating data used by a server to generate a user-ad matching list, according to an embodiment of the disclosure;

FIG. 10B is a diagram illustrating a method of generating a user-ad matching list by matching target users with a remaining advertisement of advertisers in a same manner as described in FIG. 10A when a server generates the user-ad matching list according to an embodiment of the disclosure;

FIG. 11 is a diagram illustrating a method, performed by a server, of receiving an advertisement request from the ad impression server and providing customized advertisements, according to an embodiment of the disclosure;

Throughout the drawings, it should be noted that like reference numbers are used to depict the same or similar elements, features, and structures.

MODE OF DISCLOSURE

Figure 1:
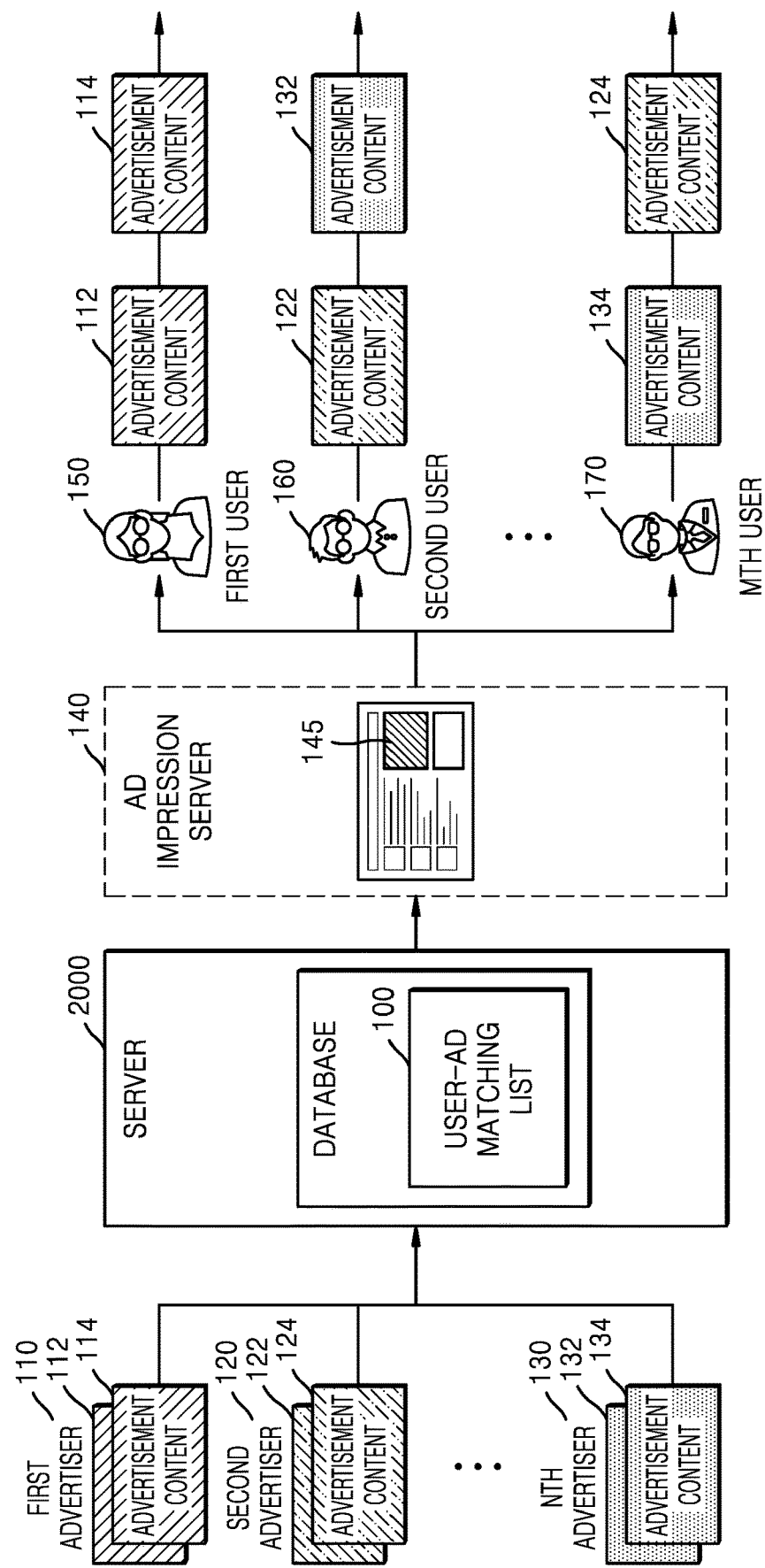
FIG. 1 is a diagram illustrating a method, performed by a server, of exposing advertisement of advertisers to users accessing an ad impression server by using a user-advertisement (user-ad) matching list generated by the server according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. In addition, some terms may be arbitrarily selected by the applicant, and in this case, the meaning of the selected terms will be described in the detailed description of the disclosure. Thus, the terms used herein have to be defined based on the meaning of the terms together with the description throughout the specification.

An expression used in the singular may encompass the expression in the plural, unless it has a clearly different meaning in the context. Terms used herein, including technical or scientific terms, may have the same meaning as commonly understood by one of ordinary skill in the art described in the disclosure. Further, the terms including ordinal numbers, such as "first", "second", and the like used in the specification may be used to describe various components, but the components should not be limited by the terms. The above terms are used only to distinguish one component from another.

When a part "includes" or "comprises" an element, unless there is a particular description contrary thereto, the part may further include other elements, not excluding the other elements. In addition, terms, such as "unit" and "module" described in the specification denote a unit that processes at least one function or operation, which may be implemented in hardware or software, or implemented in a combination of hardware and software.

Hereinafter, embodiments of the disclosure will be described with reference to the accompanying drawings such that one of ordinary skill in the art may easily implement the embodiments of the disclosure. However, the disclosure may be implemented in various different forms and is not limited to embodiments of the disclosure described herein. In addition, in the drawings, parts irrelevant to the description are omitted in order to clearly describe the disclosure, and like reference numerals designate like elements throughout the specification.

According to an embodiment of the disclosure, an online advertisement refers to a digital advertisement exposed to users of an online service. For example, online advertisements may include a search advertisement, a social media advertisement, a banner advertisement, a video advertisement, a display advertisement, and the like.

According to an embodiment of the disclosure, an online advertisement market refers to a market in which an advertisement space where an online advertisement may be displayed is transacted as a product. In this case, a supply-side of the online advertisement market may sell the advertisement space, and a demand-side may purchase the advertisement space from the supply-side and display the advertisement. The advertisement space may be a space where advertisement content is exposed in a graphic user interface (GUI) of a content provided by an online medium, and examples of the advertisement space may include an advertisement window of a web page, a video output window of a content reproduction application, and the like.

According to an embodiment of the disclosure, a supplier of the online advertisement market may be referred to as a media company or a publisher. Hereinafter, for convenience of description, the supplier of the online advertisement market will be referred to as the media company. In addition, the consumer of the online advertisement market will be referred to as the advertiser. The media company, which is the supplier, may sell the advertisement space where the advertisement will be displayed to the advertiser who is the consumer.

According to an embodiment of the disclosure, the advertisers may use a demand-side platform (DSP) to purchase the advertisement space. The DSP may interoperate with media companies or a supply-side platform (SSP), which are various suppliers of the advertisement market, to provide various functions allowing the advertiser to purchase the advertisement space of the media companies.

In addition, according to an embodiment of the disclosure, the media companies may use the SSP to sell the advertisement space. The SSP may interoperate with the advertisers or the DSP, which are various customers of the advertisement market, to provide various functions allowing the media company to sell the advertisement space. The media company may display the advertisement of the advertiser on the advertisement space sold to the advertisers, and expose the advertisement of the advertiser to the users of content from the media company.

FIG. 1 is a diagram illustrating a method, performed by a server 2000, of exposing advertisement contents 112, 114, 122, 124, 132, and 134 (hereinafter, also referred to as the advertisement content 112, 122, or 132, and another advertisement content 114, 124, or 134) of advertisers 110, 120, and 130 (hereinafter, also referred to as first, second, and nth advertisers 110, 120, and 130) to users 150, 160, and 170 (hereinafter, also referred to as first, second, and $m^{th}$ users 150, 160, and 170) accessing an ad impression server 140 by using a user-advertisement (user-ad) matching list 100 generated by the server 2000, according to an embodiment of the disclosure.

According to an embodiment of the disclosure, the server 2000 may be a server performing a function of a DSP. The server 2000 may provide a function allowing the plurality of advertisers 110, 120, and 130 to purchase an advertisement space 145.

According to an embodiment of the disclosure, the ad impression server 140 may be a server of the media company providing various online services, such as news, blogs, search engines, SNS, and other services. A medium of the media company may include an advertisement space 145 capable of exposing an advertisement to the user by using the online services, and the advertisement space 145 may be sold to the plurality of advertisers 110, 120, and 130. In addition, the ad impression server 140 may display advertisements independently on the advertisement space 145 for each of the plurality of users 150, 160, and 170 such that each of the plurality of users 150, 160, and 170 may be exposed to advertisement contents that are different from each other.

Referring to FIG. 1, the server 2000, according to an embodiment of the disclosure, may include a user-ad matching list 100 in a database.

The user-ad matching list 100 according to an embodiment of the disclosure is a list generated by matching advertisement contents 112, 114, 122, 124, 132, and 134 of the plurality of advertisers 110, 120, and 130 with the plurality of users 150, 160, and 170 based on their advertisement preferences. In this case, the plurality of users 150, 160, and 170 may be users accessing the ad impression server 140 to use the online service provided by the ad impression server 140.

The server 2000 according to an embodiment of the disclosure may provide the user-ad matching list 100 in which the advertisement contents 112, 114, 122, 124, 132, and 134 are matched with the users 150, 160, and 170 based on their preferences to make the plurality of advertisers 110, 120, and 130 purchase the advertisement space 145. In this case, when the plurality of users 150, 160, and 170 access the medium including the advertisement space 145, the advertisement contents 112, 114, 122, 124, 132, and 134 are exposed to the plurality of users 150, 160, and 170.

For example, in the user-ad matching list 100, the advertisement content 112 of the first advertiser 110 may be matched with a first user 150 based on a preference of the first user 150. In this case, the first advertiser 110 may purchase the advertisement space 145, thereby exposing the advertisement content 112 of the first advertiser 110 to the first user 150 when the first user 150 accesses the medium including the advertisement space 145.

In addition, in the user-ad matching list 100, based on the preference of the first user 150, another advertisement content 114 of the first advertiser 110 that is preferred next by the first user 150 may be matched with the first user 150. In this case, the first advertiser 110 may purchase the advertisement space 145, thereby exposing another advertisement content 114 of the first advertiser 110 to the first user 150 when the first user 150 accesses the medium including the advertisement space 145 again after the advertisement content 112 of the first advertiser 110 is exposed to the first user 150.

As another example, in the user-ad matching list 100, the advertisement content 122 of the second advertiser 120 may be matched with a second user 160 based on a preference of the second user 160. In this case, the second advertiser 120 may purchase the advertisement space 145, thereby exposing the advertisement content 122 of the second advertiser 120 to the second user 160 when the second user 160 accesses the medium including the advertisement space 145.

In addition, in the user-ad matching list 100, based on the preference of the second user 160, the advertisement content 132 of the nth advertiser 130 that is preferred next by the second user 160 may be matched with the second user 160. In this case, the nth advertiser 130 may purchase the advertisement space 145, thereby exposing the advertisement content 132 of the nth advertiser 130 to the second user 160 when the second user 160 accesses the medium including the advertisement space 145 again after the advertisement content 122 of the second advertiser 120 is exposed to the second user 160.

As another example, in the user-ad matching list 100, another advertisement content 134 of the nth advertiser 130 may be matched with an milt user 170 based on a preference of the $m^{th}$ user 170. In this case, the nth advertiser 130 may purchase the advertisement space 145, thereby exposing the other advertisement content 134 of the nth advertiser 130 to the $m^{th}$ user 170 when the $m^{th}$ user 170 accesses the medium including the advertisement space 145.

In addition, in the user-ad matching list 100, based on the preference of the $m^{th}$ user 170, another advertisement content 124 of the second advertiser 120 that is preferred next by the $m^{th}$ user 170 may be matched with the $m^{th}$ user 170. In this case, the second advertiser 120 may purchase the advertisement space 145, thereby exposing the other advertisement content 124 of the second advertiser 120 to the $m^{th}$ user 170 when the $m^{th}$ user 170 accesses the medium including the advertisement space 145 again after the other advertisement content 134 of the nth advertiser 130 is exposed to the $m^{th}$ user 170.

The server 2000 according to an embodiment of the disclosure may provide the user-ad matching list 100 in which the advertisement contents 112, 114, 122, 124, 132, and 134 are matched with the users 150, 160, and 170 based on their preferences to make the plurality of advertisers 110, 120, and 130 purchase the advertisement space 145 provided by the ad impression server 140. A particular method, performed by the server 2000, of generating the user-ad matching list 100 will be described. In addition, hereinafter, for convenience of description, the advertisement content of the advertiser for advertising a product to the user will be referred to as the advertisement.

Figure 2:
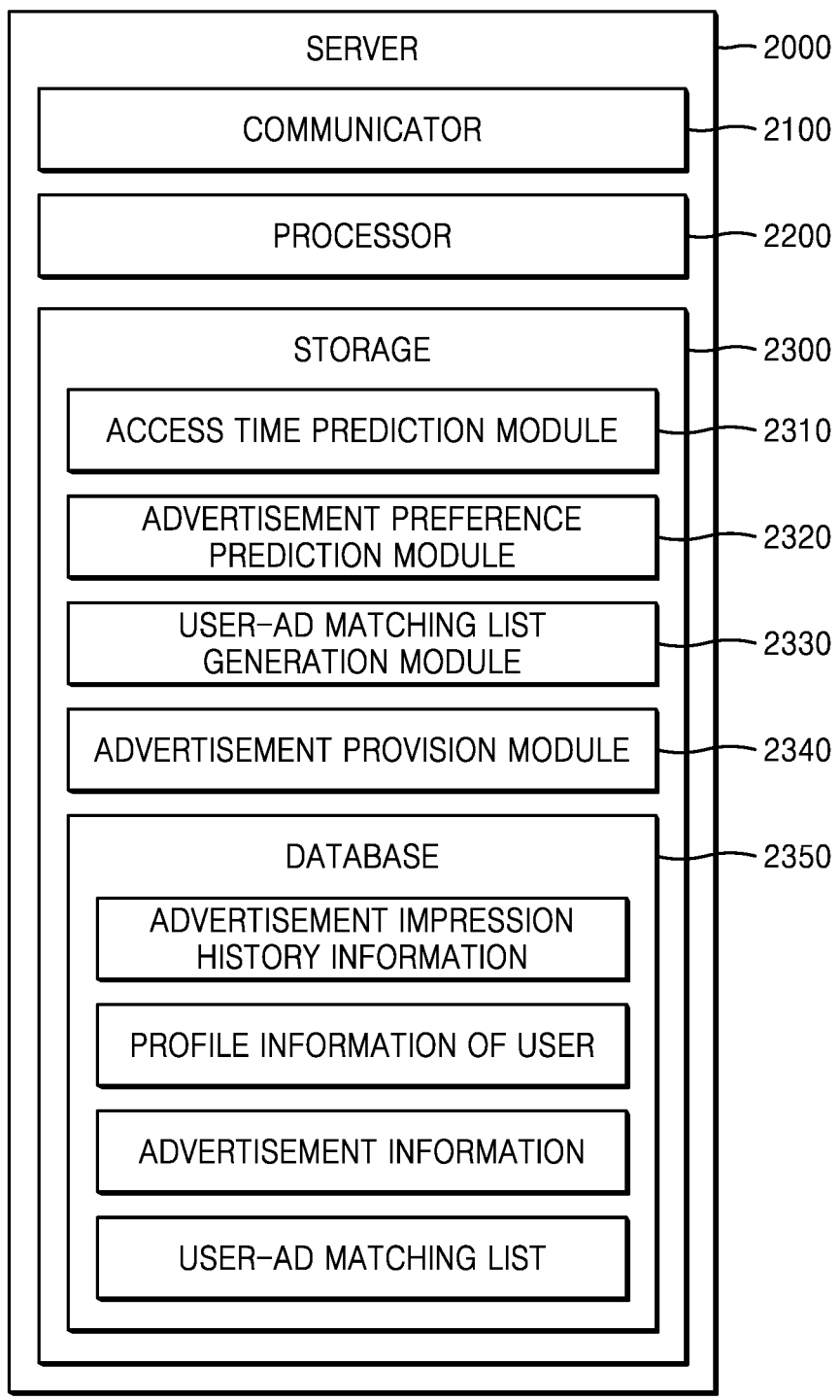
FIG. 2 is a block diagram illustrating a server configured to generate the user-ad matching list for online advertisement according to an embodiment of the disclosure.

FIG. 2 is a block diagram illustrating a server configured to generate a user-ad matching list for online advertisement according to an embodiment of the disclosure.

Referring to FIG. 2, the server 2000 may include a communicator 2100, a processor 2200, and a storage 2300.

The communicator 2100 may perform data communication with the ad impression server 140 under control by the processor 2200. In addition, the communicator 2100 may perform data communication not only with the ad impression server 140 but also with other servers provided by the SSP connected to the ad impression server 140.

The communicator 2100 may perform data communication with other servers that provide the ad impression server 140 or the SSP by using at least one of data communication methods including, for example, a wired local area network (LAN), a wireless LAN, Wi-Fi, Bluetooth™, ZigBee, Wi-Fi direct (WFD), infrared data association (IrDA), Bluetooth low energy (BLE), near field communication (NFC), wireless broadband Internet (Wibro), world interoperability for microwave access (WiMAX), shared wireless access protocol (SWAP), wireless gigabit alliance (WiGig), and radio frequency (RF) communication.

The communicator 2100 according to an embodiment of the disclosure may receive information about the advertisement space 145 from the ad impression server 140 or the SSP servers, and may transmit advertisement space bidding information of the advertiser and advertisement information of the advertiser for purchasing the received advertisement space 145.

The processor 2200 may execute one or more instructions of a program stored in the storage 2300. The processor 2200 may include a hardware component performing arithmetic operations, logic operations, input/output operations, and signal processing.

The processor 2200 may be configured of at least one of, for example, a central processing unit (CPU), a microprocessor, a graphics processing unit (GPU), an application specific integrated circuit (ASIC), a digital signal processor (DSP), a digital signal processing device (DSPD), a programmable logic device (PLD), a field programmable gate array (FPGA), an application processor (AP), a neural processing unit, or an artificial intelligence-dedicated processor designed in a hardware structure specialized for processing of an artificial intelligence model, but is not limited thereto.

The processor 2200 according to an embodiment of the disclosure may generate the user-ad matching list 100 to allow purchasing of the advertisement space 145 where online advertisement is transmitted to the advertisers 110, 120, and 130.

According to an embodiment of the disclosure, the processor 2200 may match the advertisements with the users 150, 160, and 170 for each of the advertisements of the plurality of advertisers 110, 120, and 130. The processor 2200 may, for one advertisement, identify candidate users for the advertisement based on profile information of the users 150, 160, and 170 accessing the ad impression server 140 and predict an access time when candidate users will access the ad impression server 140 in the future. In addition, the processor 2200 may select target users to be provided with the advertisement among the candidate users based on the predicted access time, obtain preferences of the target users for the advertisement of the advertiser, and match the advertisement with the users 150, 160, and 170 based on the obtained preferences. In the same manner, the processor 2200 may match the advertisement with the users 150, 160, and 170 with respect to each of the plurality of advertisements, thereby generating the user-ad matching list 100.

The storage 2300 may include, for example, a non-volatile memory including at least one of a flash memory, a hard disk, a multimedia card micro type memory, a card type memory (for example, a secure digital (SD) memory, an eXtreme Digital (XD) memory, or the like), read-only memory (ROM), an electrically erasable programmable read-only memory (EEPROM), a programmable read-only memory (PROM), a magnetic memory, a magnetic disk, or an optical disk, and a volatile memory, such as random access memory (RAM) or static random access memory (SRAM).

The storage 2300 may store instructions, data structures, and program codes, which may be read by the processor 2200. According to embodiments of the disclosure, operations performed by the processor 2200 may be implemented by executing program instructions or codes stored in the storage 2300.

According to an embodiment of the disclosure, the storage 2300 may store data and program instruction codes corresponding to an access time prediction module 2310, an advertisement preference prediction module 2320, a user-ad matching list generation module 2330, an advertisement provision module 2340, and a database 2350.

According to an embodiment of the disclosure, the processor 2200 may identify the candidate users for the advertisement for exposure by the advertiser based on the profiles of the users 150, 160, and 170.

According to an embodiment of the disclosure, the processor 2200 may predict the access time when candidate users will access the ad impression server 140 in the future, by using data and instruction codes regarding the access time prediction module 2310. For example, the processor 2200 may input profile information of the candidate users and advertisement impression history information of the candidate users to a first artificial intelligence model, thereby predicting the access time when the candidate users will access the ad impression server 140 in the future. In this case, the processor 2200 may select the target users to be provided with the advertisement of the advertiser among the candidate users, based on the predicted access time.

According to an embodiment of the disclosure, the processor 2200 may obtain the preferences of the target users for an advertisement product, by using data and instruction codes regarding the advertisement preference prediction module 2320. For example, the processor 2200 may input profile information of the target users, advertisement impression history information of the target users, and advertisement information to a second artificial intelligence model, thereby obtaining preference, which indicates the degree of preference of each of the target users for the advertisement product of the advertiser.

According to an embodiment of the disclosure, the processor 2200 may generate a list wherein the plurality of users 150, 160, and 170 are matched with the plurality of advertisements, by using data and instruction codes regarding the user-ad matching list generation module 2330. For example, the processor 2200 may match the users 150, 160, and 170 who prefer a corresponding advertisement with the corresponding advertisement, based on the obtained preference of each target user for one advertisement. In the same manner, the processor 2200 may match the users 150, 160, and 170 with another advertisement based on the obtained preference of each target user for another advertisement. In the same manner as described above, the processor 2200 may generate the user-ad matching list 100 by matching the users 150, 160, and 170 with the advertisements with respect to all advertisements to be advertised by the advertisers 110, 120, and 130, by using the user-ad matching list generation module 2330.

According to an embodiment of the disclosure, the processor 2200 may make the advertiser purchase the advertisement space 145 of the medium, by using data and instruction codes regarding the advertisement provision module 2340. For example, the processor 2200 may identify identification information of the user accessing the ad impression server 140 when the server 2000 receives information about the advertisement space 145 of the ad impression server 140 according to the access by the user to the ad impression server 140. The processor 2200 may retrieve an advertisement matched to a time slot during which access by the user occurs from the user-ad matching list 100, with respect to the identified users. The processor 2200 may provide advertisement information for exposing the advertisement to the user by displaying the matched advertisement on the advertisement space 145 to the ad impression server 140 or the SSP server, by using the advertisement provision module 2340.

According to an embodiment of the disclosure, the database 2350 included in the storage 2300 may store the advertisement impression history information indicating the access history of the users 150, 160, and 170 who accessed the ad impression server 140, the profile information of the users 150, 160, and 170 who accessed the ad impression server 140, the advertisement information regarding the advertisement for exposure to the users 150, 160, and 170 by the advertisers 110, 120, and 130, and the user-ad matching list 100 wherein the plurality of users 150, 160, and 170 are matched with the plurality advertisements.

Figure 3:
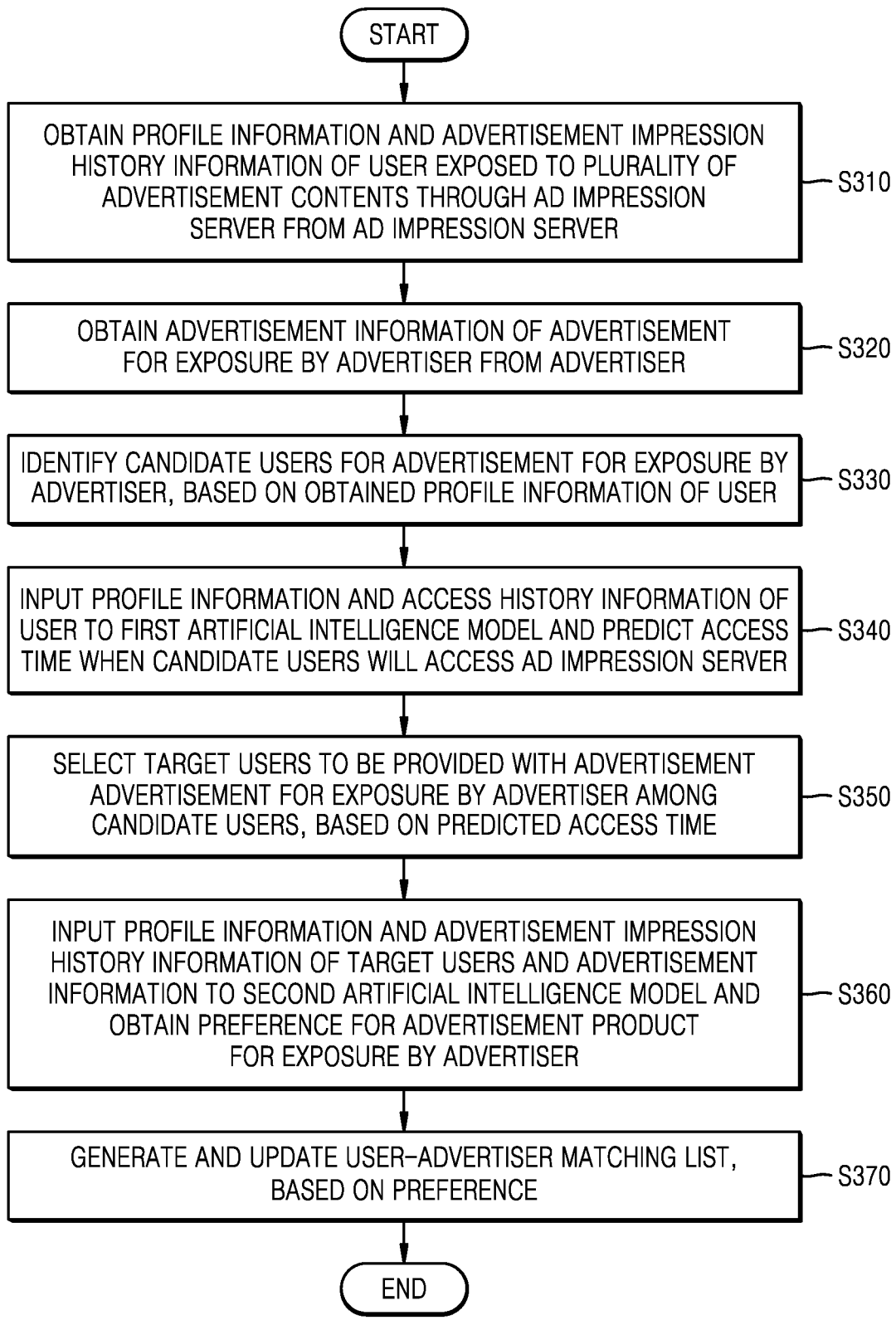
FIG. 3 is a flowchart illustrating a method, performed by a server, of generating a user-ad matching list for online advertisement, according to an embodiment of the disclosure.

FIG. 3 is a flowchart illustrating a method, performed by a server, of generating a user-ad matching list for online advertisement, according to an embodiment of the disclosure.

In operation S310, the server 2000 according to an embodiment of the disclosure may obtain the profile information of the users 150, 160, and 170 of the ad impression server 140 and the advertisement impression history information of the users 150, 160, and 170 from the ad impression server 140. The user profile information may include the profile information of people exposed to the plurality of advertisement contents 112, 114, 122, 124, 132, and 134 by accessing the ad impression server 140. The profile information of the users may include information, such as user identification information (User ID) for identifying users, age, gender, income, education, residence area, and interest, but is not limited thereto.

The advertisement impression history information may include history information regarding the advertisement exposed to the user when the user accessed the ad impression server 140. In addition, the advertisement impression history information may include history information regarding advertisement exposure to each of the plurality of users 150, 160, and 170.

The advertisement impression history information may include advertisement identification information (Ad ID) for identifying the advertisement, the User ID for identifying the user exposed to the advertisement, information indicating whether the exposed advertisement was selected by the user (IsClick), and the date and time the advertisement was exposed to the user, but is not limited thereto.

In operation S320, the server 2000 according to an embodiment of the disclosure may obtain advertisement information from the advertiser. The advertisement information may include various information regarding the advertisement product to be delivered by the advertiser. The server 2000 may obtain the advertisement information from the input of the advertiser, receive the advertisement information input from a client device of the advertiser, or receive the advertisement information from a server of the advertiser. The advertisement information may include information, such as the Ad ID for identifying the advertisement, the advertiser, a category of products advertised by the advertiser, the advertisement product, and product price, but are not limited thereto.

In addition, referring to FIG. 3, although operation S320 is illustrated after operation S310, it is not limited thereto, and operation S320 may be performed before operation S310.

In operation S330, the server 2000 according to an embodiment of the disclosure may identify the candidate users for the advertisement for exposure by the advertiser, based on the obtained user profile information.

In this case, the candidate user may be first filtered users meeting the advertising condition of the advertiser among the plurality of users 150, 160, and 170 to expose the advertisement of the advertiser.

For example, when the advertisement of the advertiser is for males in their twenties, the server 2000 may identify users with profile information for males in their twenties as candidate users among the plurality of users based on the profile information of the plurality of users 150, 160, and 170. In addition, the server 2000 may generate a candidate user list by listing the selected candidate users.

In operation S340, the server 2000 according to an embodiment of the disclosure may input the profile information of the candidate users and advertisement impression history information of the candidate users to the first artificial intelligence model, thereby predicting the access time when the candidate users will access the ad impression server 140 in the future.

For example, the server 2000 may predict that a first candidate user may access the ad impression server 140 at 12:00~13:00 on Monday, Tuesday, and Wednesday among the candidate users with the profile information for males in their twenties identified in operation S330. In addition, the server 2000 may predict that a second candidate user may access the ad impression server 140 at 19:00~21:00 on the weekend among the candidate users with the profile information for males in their twenties identified in operation S330. A method, performed by the server 2000 of predicting the access time of the candidate users will be described with reference to FIG. 7.

In operation S350, the server 2000 according to an embodiment of the disclosure may select the target users to be provided with the advertisement of the advertiser, based on the estimated future access time of the candidate users predicted in operation S340.

In this case, the target users may be filtered users meeting the advertising condition of the advertiser among the candidate users to expose the advertisement of the advertiser.

For example, when the advertisement of the advertiser is an advertisement to be displayed on media at 12:00~13:00 on Monday, the server 2000 may select the first candidate user as the target user among the candidate users identified in operation S330. As another example, when the advertisement of the advertiser is an advertisement to be displayed on media at 20:00~21:00 on the weekend, the server 2000 may select the second candidate user as the target user among the candidate users identified in operation S330.

According to an embodiment of the disclosure, the server 2000 may generate a target user list by listing the selected target users.

In operation S360, the server 2000 according to an embodiment of the disclosure may obtain a preference indicating the degree of preference of the target users selected in operation S350 for the advertisement product of the advertiser. The server 2000 may input the profile information of the target users, the advertisement impression history information of the target users, and the advertisement information of the advertiser to the second artificial intelligence model, thereby obtaining the preferences of the target users for the product of advertisement for exposure by the advertiser. However, the preferences of the target users are not limited to the advertisement product of the advertiser, and may indicate the preference for the advertisement itself of the advertiser.

The server 2000 may obtain a preference in quantified form for each of the target users. For example, the quantified preference of the first target user and the quantified preference of the second target user for the advertisement of the advertiser may be X and Y, respectively. A particular method, performed by the server 2000 of obtaining the preferences of the target users for the advertisement will be described with reference to FIG. 9.

In operation S370, the server 2000 according to an embodiment of the disclosure may generate and update the user-ad matching list 100, based on the preferences of the target users.

For example, the server 2000 may generate the user-ad matching list 100 by matching the advertisement of the advertiser with the target users, based on the preferences of the target users for the advertisement product of the advertiser.

In the same manner, the server 2000 according to an embodiment of the disclosure may perform at least part of the operations among operations S310 to S360, select the target users for another advertisement, and obtain their preference for another advertisement product. The server 2000 may match the other advertisement with the target users selected for the other advertisement and may update the user-ad matching list 100 by adding a result of the matching to the user-ad matching list 100.

The server 2000 may, for each of the plurality of advertisements, perform at least part of the operations among operations S310 to S360, match each advertisement with the target users for each advertisement, and generate the user-ad matching list 100 by adding the result of the matching to the user-ad matching list 100.

FIG. 4 is a diagram illustrating data used by a server to generate a user-ad matching list according to an embodiment of the disclosure.

Referring to FIG. 4, data used by the server 2000 according to an embodiment of the disclosure for generating the user-ad matching list 100 may be advertisement impression history information 410, advertisement information 420, or profile information 430. However, examples of data are not limited thereto, and the server 2000 may generate the user-ad matching list 100 by using only part of the data described above, or may further use other data to generate the user-ad matching list 100.

The advertisement impression history information 410 may include history information regarding the advertisement that has been exposed to the user when the user accessed the ad impression server 140. In addition, the advertisement impression history information 410 may include history information regarding advertisement exposure to each of the plurality of users 150, 160, and 170.

The advertisement impression history information 410 may include the Ad ID for identifying the advertisement, the User ID for identifying the user exposed to the advertisement, information indicating whether the exposed advertisement was selected by the user (IsClick), and the date and time the advertisement was exposed to the user, but is not limited thereto.

For example, in regard to a first advertisement (Ad ID: 1), the advertisement impression history information 410 may indicate that the first advertisement has been exposed to the 25th user (User ID: 25), the first advertisement has been exposed to the 25th user on Sep. 13, 2020, 12:01:07, and the first advertisement was not selected by the 25th user.

For example, in regard to a second advertisement (Ad ID: 2), the advertisement impression history information 410 may indicate that the second advertisement has been exposed to the third user (User ID: 3), the second advertisement has been exposed to the third user on Sep. 13, 2020, 12:01:12, and the second advertisement was selected by the third user.

The advertisement information 420 of the advertisers 110, 120, and 130 may include information about the advertisement of each of the plurality of advertisers 110, 120, and 130. The advertisement information 420 may include information, such as the Ad ID for identifying the advertisement, the advertiser, a category of products advertised by the advertiser, the advertisement product, and product price, but is not limited thereto.

For example, in regard to the first advertisement (Ad ID: 1), the advertisement information 420 may include information of the advertiser (Company A), category information of the advertisement product (shoes), detailed product information (for example, a product name, a product number, or the like), product price information, and the like.

For example, in regard to the second advertisement (Ad ID: 2), the advertisement information 420 may include information of the advertiser (Company B), category information of the advertisement product (car), detailed product information, product price information, and the like.

The profile information 430 of the users 150, 160, and 170 obtained from the ad impression server 140 may include the profile information 430 of the users 150, 160, and 170 who had accessed the ad impression server 140 and have been exposed to the advertisement. The profile information 430 of the users 150, 160, and 170 may include information, such as the User ID for identifying users, age, gender, income, education, residence area, and interest, but is not limited thereto.

Figure 5:
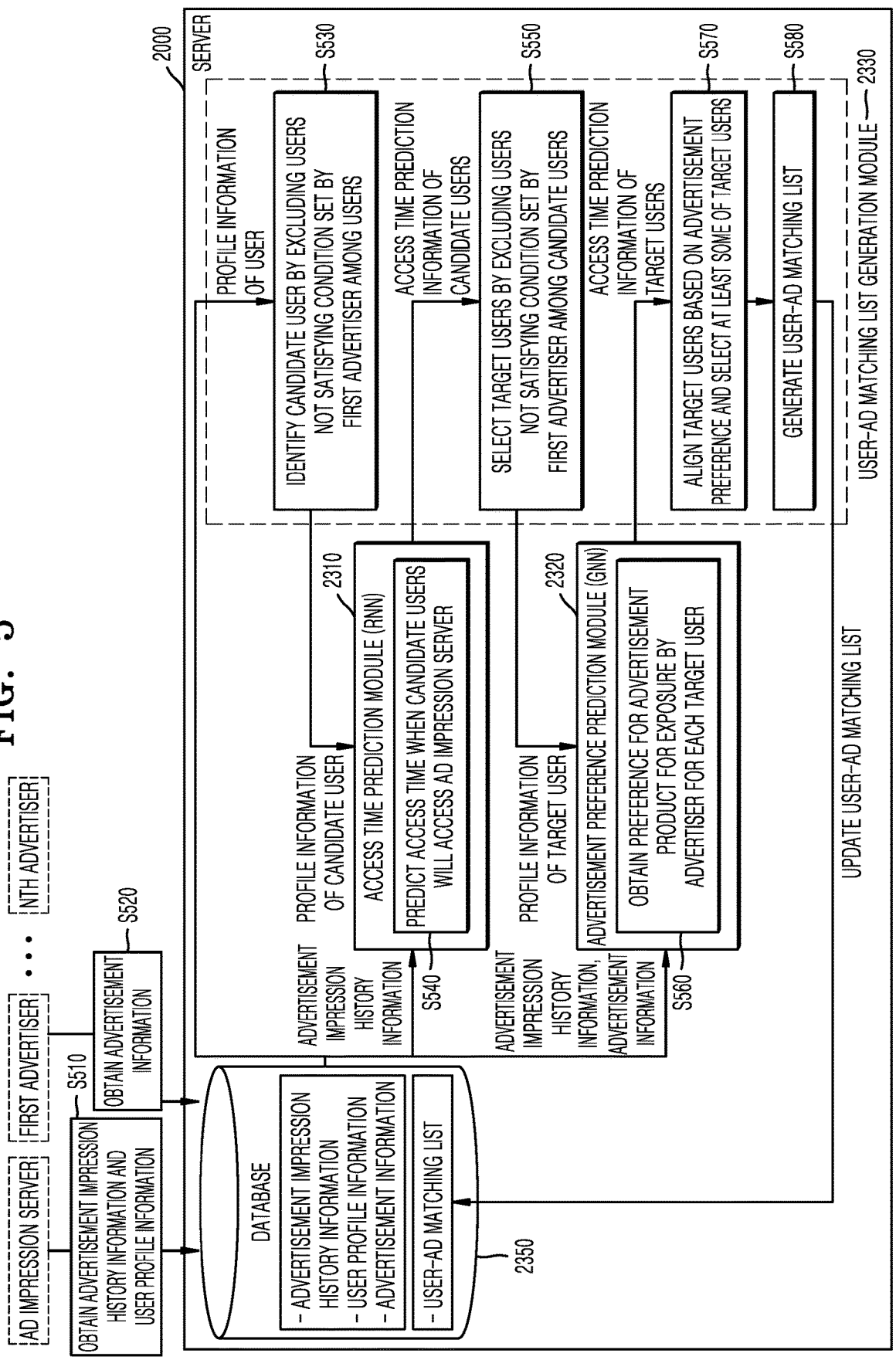
FIG. 5 is a diagram illustrating a flow of data used by a server in a process of generating a user-ad matching list with respect to an advertisement of an advertiser, according to an embodiment of the disclosure.

FIG. 5 is a diagram illustrating a flow of data used by a server 2000 in a process of generating a user-ad matching list with respect to an advertisement of an advertiser, according to an embodiment of the disclosure.

Referring to FIGS. 5 to 9, the generating of the user-ad matching list 100 may be performed by the plurality of advertisers 110, 120, and 130. However, hereinafter, for convenience of description, generating part of the matching list by matching the advertisement of the first advertiser 110 with a plurality of users 150, 160, and 170 will be described.

Referring to FIG. 5, in operation S510, the server 2000 according to an embodiment of the disclosure may obtain the advertisement impression history information 410 and the profile information 430 of the users 150, 160, and 170 from the ad impression server 140. Operation S510 may correspond to operation S310 of FIG. 3.

In operation S520, the server 2000 according to an embodiment of the disclosure may obtain the advertisement information 420 about the advertisement product of the first advertiser 110 from the first advertiser 110. Operation S520 may correspond to operation S320 of FIG. 3.

The server 2000 according to an embodiment of the disclosure may store the obtained advertisement impression history information 420, user profile information 430, and the advertisement information 420 of the first advertiser 110 in the database 2350.

In operation S530, the server 2000 according to an embodiment of the disclosure may identify the candidate users for selecting the target users to be provided with the advertisement of the first advertiser 110 among the users 150, 160, and 170 that accessed the ad impression server 140 by using the user-ad matching list generation module 2330. In this case, the profile information 430 of the user may be used. For example, the server 2000 may identify the candidate users by excluding the users 150, 160, and 170 having the profile information 430 that do not meet the condition set by the first advertiser 110 among the users 150, 160, and 170, based on the profile information 430 of the users 150, 160, and 170. Operation S530 may correspond to operation S330 of FIG. 3.

In operation S540, the server 2000 according to an embodiment of the disclosure may predict the access time when the candidate users will access the ad impression server 140 in the future. In this case, the profile information 430 of the candidate users and advertisement impression history information 410 of the candidate users may be used. The server 2000 may identify the advertisement impression history information 410 corresponding to the candidate users identified in operation S530, based on the User ID included in the advertisement impression history information 410, and predict the access time when the candidate users will access the ad impression server 140 by inputting the profile information 430 of the candidate users and the advertisement impression history information 410 of the candidate users to the first artificial intelligence model. In this case, the first artificial intelligence model may be a recurrent neural network (RNN) model, but is not limited thereto.

For example, the server 2000 may predict the date and time when the first user 150 will access the ad impression server 140 for a certain period in the future, based on the date, time, number of times, or the like. the first candidate user accessed the ad impression server 140 for a certain period in the past. In the same manner, the server 2000 may predict the date and time each of the candidate users accessed ad impression server 140, with respect to each of the identified candidate users. Operation S540 may correspond to operation S340 of FIG. 3.

In operation S550, the server 2000 according to an embodiment of the disclosure may select the target users to be provided with the advertisement of the first advertiser 110 among the candidate users by using the user-ad matching list generation module 2330. In this case, the access time prediction information of the candidate users output from the access time prediction module 2310 may be used. For example, the server 2000 may select the target users by excluding the candidate users who do not meet the condition set by the first advertiser 110, based on the condition set by the first advertiser 110 to display advertisements in a certain time slot on a specific date. Operation S550 may correspond to operation S350 of FIG. 3.

In operation S560, the server 2000 according to an embodiment of the disclosure may obtain a preference of each target user for the product of the advertisement for exposure by the advertiser, by using the advertisement preference prediction module 2320. In this case, the profile information 430 of the target users, the advertisement impression history information 410 of the target users, and advertisement information 420 of the first advertiser 110 may be used. The server 2000 may identify the advertisement impression history information 410 corresponding to the target users selected in operation S550, based on the User ID included in the advertisement impression history information 410, and obtain the preferences of the target users for the advertisement product of the first advertiser 110 by inputting the profile information 430 and the advertisement impression history information 410 of the target users to the second artificial intelligence model to. In this case, the second artificial intelligence model may be a graph neural network model, but is not limited thereto.

For example, the server 2000 may obtain a preference of the first target user by quantifying the degree of preference of the first target user for the advertisement product of the first advertiser 110. In this case, the server 2000 may, based on information on advertisements previously exposed to the first target user, the information included in the advertisement impression history information 410 of the first target user, and information on whether the first target user clicked the advertisement that had been exposed to the first target user, quantify the degree or likelihood of preference of the first target user for the advertisement product of the first advertiser 110, thereby obtaining the preference of the first target users. In the same manner, the server 2000 may obtain a preference for target users indicating the degree of preference of each of the target users for the advertisement product of the first advertiser 110, with respect to each of the selected target users. Operation S560 may correspond to operation S360 of FIG. 3.

In operation S570, the server 2000 may align the target users based on the preference of target users for the advertisement product of the first advertiser 110 and select at least some of the target users, by using the user-ad matching list generation module 2330.

According to an embodiment of the disclosure, the server 2000 may select all of the target users to match the advertisement of the first advertiser 110 with the users 150, 160, and 170. According to an embodiment of the disclosure, the server 2000 may select some of the target users to match the advertisement of the first advertiser 110 with the users 150, 160, and 170.

For example, the server 2000 may select some of the target users based on whether the preference for the advertisement of the first advertiser 110 is greater than or equal to a certain threshold value, and match the advertisement of the first advertiser 110 with the target users whose preference is above a certain threshold value.

As another example, the server 2000 may obtain a budget value for the advertisement of the first advertiser 110 and select some of the target users within the budget range to perform the advertisement within the advertisement budget of the first advertiser 110. In this case, the target users selected within the budget range of the first advertiser 110 may be selected according to the order in which the target users are aligned based on the preference. In addition, the server 2000 may select a preliminary target user among the unselected target users when selecting some of the target users to perform the advertisement within the advertisement budget of the advertiser.

In this case, the preliminary target user may be preliminary selected target users for exposure of the advertisement of the advertiser in case the advertisement of the advertiser is not exposed to the target users selected for exposure of the advertisement of the advertiser.

According to an embodiment of the disclosure, the selected target users who are predicted to access the ad impression server 140 in the future may not actually access the ad impression server 140. Therefore, when some of the selected target users do not access the ad impression server 140 and are not exposed to the advertisement of the first advertiser 110, the server 2000 may select preliminary target users to further execute the advertisement within the budget of the first advertiser 110.

In operation S580, the server 2000 according to an embodiment of the disclosure may generate the user-ad matching list 100. The user-ad matching list 100 may include items of advertisement candidates for time slots of each of the users 150, 160, and 170. In this case, the advertisement candidate for each time slot may refer to the advertisement candidate to be exposed to the user when the user accesses the ad impression server 140 in the corresponding time for each time slot. The server 2000 may add the Ad ID of the of the first advertiser 110 to an item indicating the advertisement candidate for time slot for each of the target users of the user-ad matching list 100, based on the preferences of the target users.

For example, based on the preference of the first target user, the server 2000 may, by adding the Ad ID of the first advertiser 110 to the item of the advertisement candidate in the time slot of 14:00~15:00 on Monday of the first target user included in the user-ad matching list 100, set the advertisement of the first advertiser 110 to be exposed to the first target user when the first target user access the ad impression server 140 in the time slot of 14:00~15:00 on Monday.

As another example, based on the preference of the second target user, the server 2000 may not add the identification information of the first advertiser 110 to the item of the advertisement candidate in the time slot of 14:00~15:00 on Monday of the second target user included in the user-ad matching list 100, and based on the preference of the third target user, the server 2000 may add the identification information of the first advertiser 110 to the item of the advertisement candidate in the time slot of 14:00~15:00 on Monday of the third target user.

Operations S570 to S580 may correspond to operation S370 of FIG. 3.

The server 2000 according to an embodiment of the disclosure may select the target user for the advertisements of other advertisers as well, and may match the advertisement of other advertisers with the target users. For example, the server 2000 may generate the user-ad matching list 100 by performing operations S510 to S580 described above, with respect to each of the advertisements of the second advertiser 120 to the nth advertiser 130.

In addition, the server 2000 according to an embodiment of the disclosure may perform operations S510 to S580 at intervals of a certain period, thereby updating the user-ad matching list 100.

Figure 6:
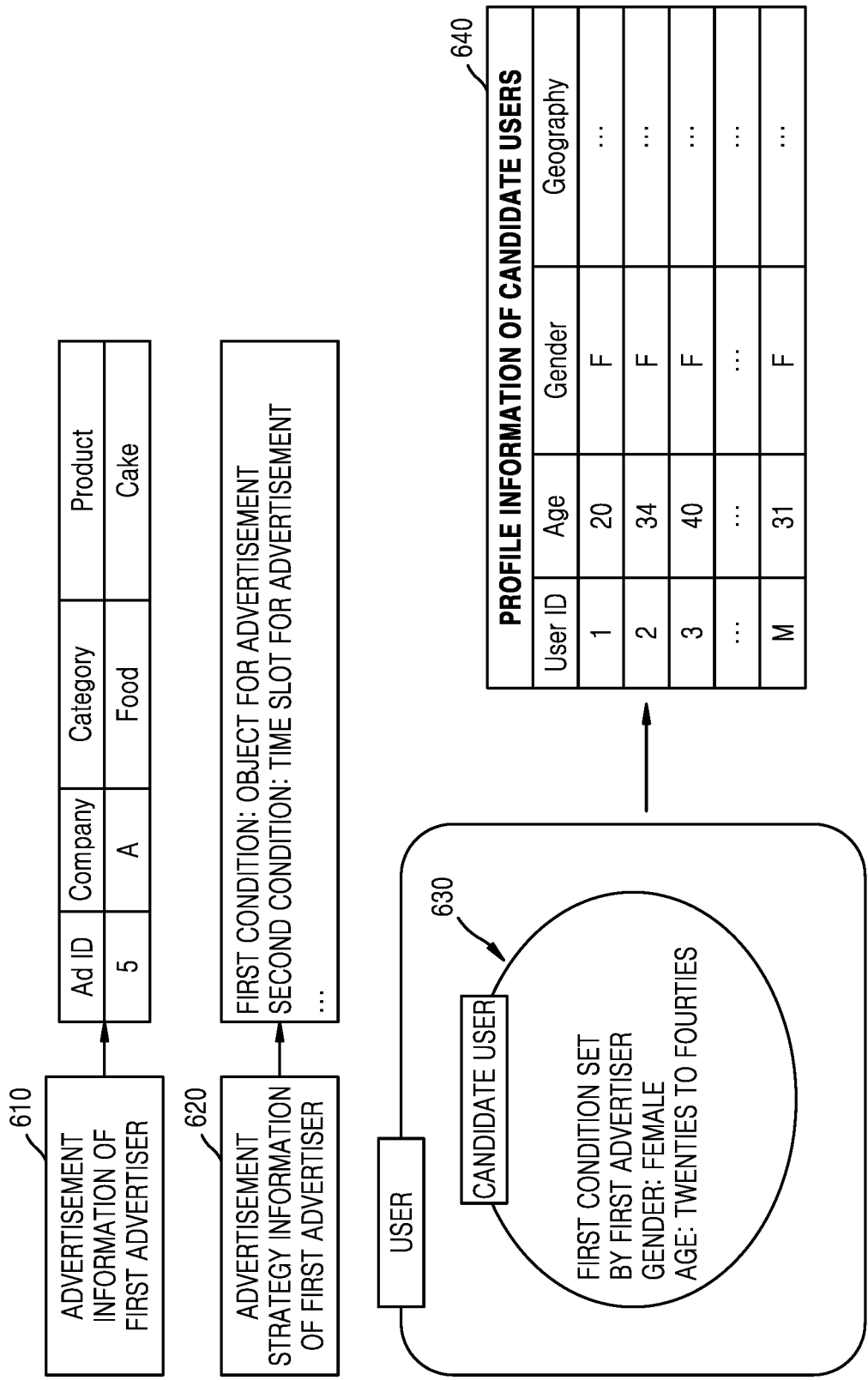
FIG. 6 is a diagram illustrating a method, performed by a server, of identifying candidate users for an advertisement of an advertiser, according to an embodiment of the disclosure.

FIG. 6 is a diagram illustrating a method, performed by a server of identifying a candidate users for an advertisement of an advertiser, according to an embodiment of the disclosure.

Referring to FIG. 6, the server 2000 according to an embodiment of the disclosure may obtain advertisement information 610 about the advertisement for exposure by the first advertiser 110 from the first advertiser 110. For example, the advertisement information 610 of the first advertiser 110 may include information, such as "the advertisement identification number is 5, the first advertiser is company A, the category of the advertisement product is food, and the advertisement product is cake." However, examples of the advertisement information 610 is not limited thereto, and the advertisement information 610 may include only part of the information described above, or may further include other information.

The server 2000 according to an embodiment of the disclosure may obtain advertisement strategy information 620 including a plurality of conditions for exposing the advertisement of the first advertiser 110 on the ad impression server 140 from the first advertiser 110. For example, the server 2000 may obtain the advertisement strategy information 620 including a plurality of conditions set to advertise a cake, which is the product of company A, that is, the first advertiser 110.

The plurality of conditions included in the advertisement strategy information 620 may include, for example, clients for advertisement, the time slot for advertisement, the period of advertisement, an average number of advertisement impressions, or the like, but is not limited thereto, and various conditions may be included for the advertisement strategy of the advertiser.

The server 2000 according to an embodiment of the disclosure may identify the users satisfying the first condition among the users 150, 160, and 170 of the ad impression server 140 as candidate users, based on a first condition, which is a condition regarding the object for advertisement by the advertiser among the plurality of conditions included in the advertisement strategy information 620, and the profile information 430 of the users 150, 160, and 170. In this case, the profile information 430 of the user may be obtained from the ad impression server 140 and stored in the database 2350 of the server 2000.

According to an embodiment of the disclosure, when the first condition regarding the object for advertisement by the first advertiser 100 is females in their twenties to forties, the server 2000 may search the users satisfying the first condition among the profile information 430 of the users 150, 160, and 170 stored in the database 2350. The server 2000 may identify the candidate users 630 being in their twenties to forties and having a female gender based on a result of the searching.

According to an embodiment of the disclosure, when the first condition regarding the object for advertisement by the first advertiser 100 is males living in Seoul, the server 2000 may search the users satisfying the first condition among the profile information 430 of the users 150, 160, and 170 stored in the database 2350. The server 2000 may identify the candidate users (not shown) living in Seoul and having a male gender based on a result of the searching.

According to an embodiment of the disclosure, the server 2000 may generate a candidate user list by listing the identified candidate users. In addition, the server 2000 may obtain the profile information 640 of the candidate users corresponding to the identified candidate users.

The server 2000 may predict the time when the identified candidate users will access the ad impression server 140 and select the target users to be provided with the advertisement of the advertiser among the candidate users based on a result of the prediction. This will be described with reference to FIG. 8.

Figure 7:
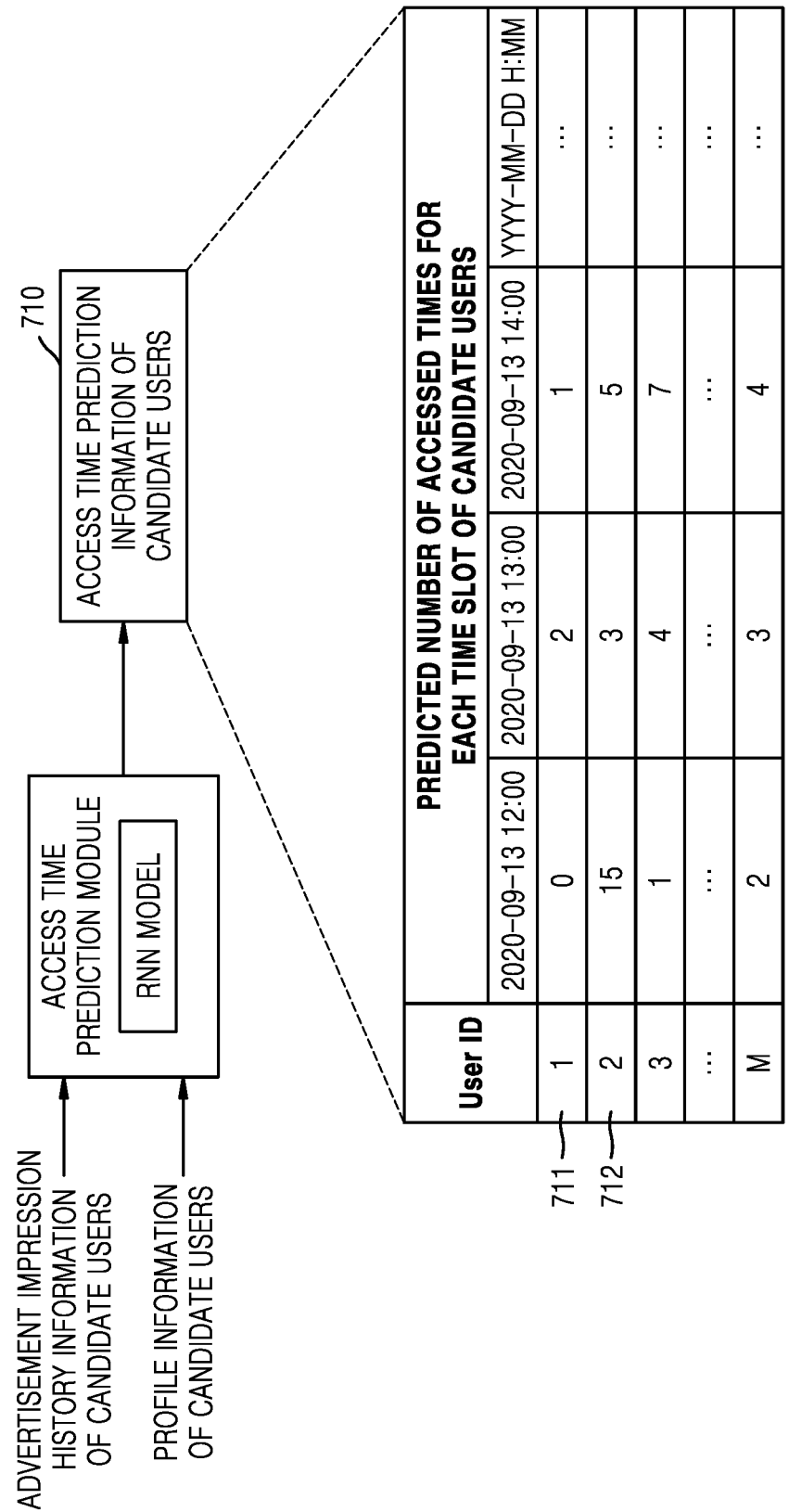
FIG. 7 is a diagram illustrating a method, performed by a server, of predicting an access time when a candidate users will access an ad impression server, according to an embodiment of the disclosure.

FIG. 7 is a diagram illustrating a method, performed by a server, of predicting an access time when a candidate users will access an ad impression server, according to an embodiment of the disclosure.

Referring to FIG. 7, the server 2000 according to an embodiment of the disclosure may predict the access time when the candidate users for the advertisement of the first advertiser 110 will access the ad impression server 140 for a certain period in the future, by using the access time prediction module 2310.

According to an embodiment of the disclosure, the server 2000 may identify the advertisement impression history information 410 corresponding to the identified candidate users, based on the User ID included in the advertisement impression history information 410, and predict the access time when the candidate users will access the ad impression server 140 in the future by using the profile information 640 of the candidate users and the advertisement impression history information 410 of the candidate users.

According to an embodiment of the disclosure, the advertisement impression history information 410 may include access history information. The access time prediction module 2310 may generate the access history information by counting the number of times each of the candidate user accessed the ad impression server 140 for a certain period in the past for each time slot at certain intervals, from the advertisement impression history information 140 of the candidate users during a certain period in the past.

The server 2000 may input the access history information indicating the number of times candidate users accessed the ad impression server 140 in the past for each time slot and the profile information 640 of the candidate users to the first artificial intelligence model, thereby outputting access time prediction information 710 wherein the access time when each of the candidate users will access the ad impression server 140 for a certain period in the future is predicted.

For example, the with respect to the date of Sep. 13, 2020, the predicted numbers of times the first candidate user 711 will access the ad impression server 140 for each time slot are zero times at 12:00~13:00, two times at 13:00~14:00, and one time at 14:00~15:00. In addition, the predicted numbers of times the second candidate user 712 will access the ad impression server 140 for each time slot are fifteen times at 12:00~13:00, three times at 13:00~14:00, and five times at 14:00~15:00.

In the same manner, with respect to the third candidate user to the $m^{th}$ candidate user, the server 2000 may obtain the predicted numbers of times each of the candidate users will access the ad impression server 140 for each time slot.

In FIG. 7, for convenience of description, embodiments of a plurality of time slots having one-hour intervals were described, but it is not limited thereto, and the predicted number of accessed times for each time slot may be predicted based on various time intervals (for example, every 5 minutes, every 30 minutes).

The server 2000 according to an embodiment of the disclosure may periodically learn based on newly collected data, thereby updating the first artificial intelligence model. For example, the server 2000 may train the first artificial intelligence model, by using advertisement impression history information 410 and the profile information 430 of the users 150, 160, and 170 newly obtained from the ad impression server 140. The server 2000 may output the access time prediction information 710 wherein the access time when the candidate users will access the ad impression server 140 in the future for a certain period is predicted, by applying the advertisement impression history information 410 of the candidate users and the profile information 640 of the candidate users.

Figure 8:
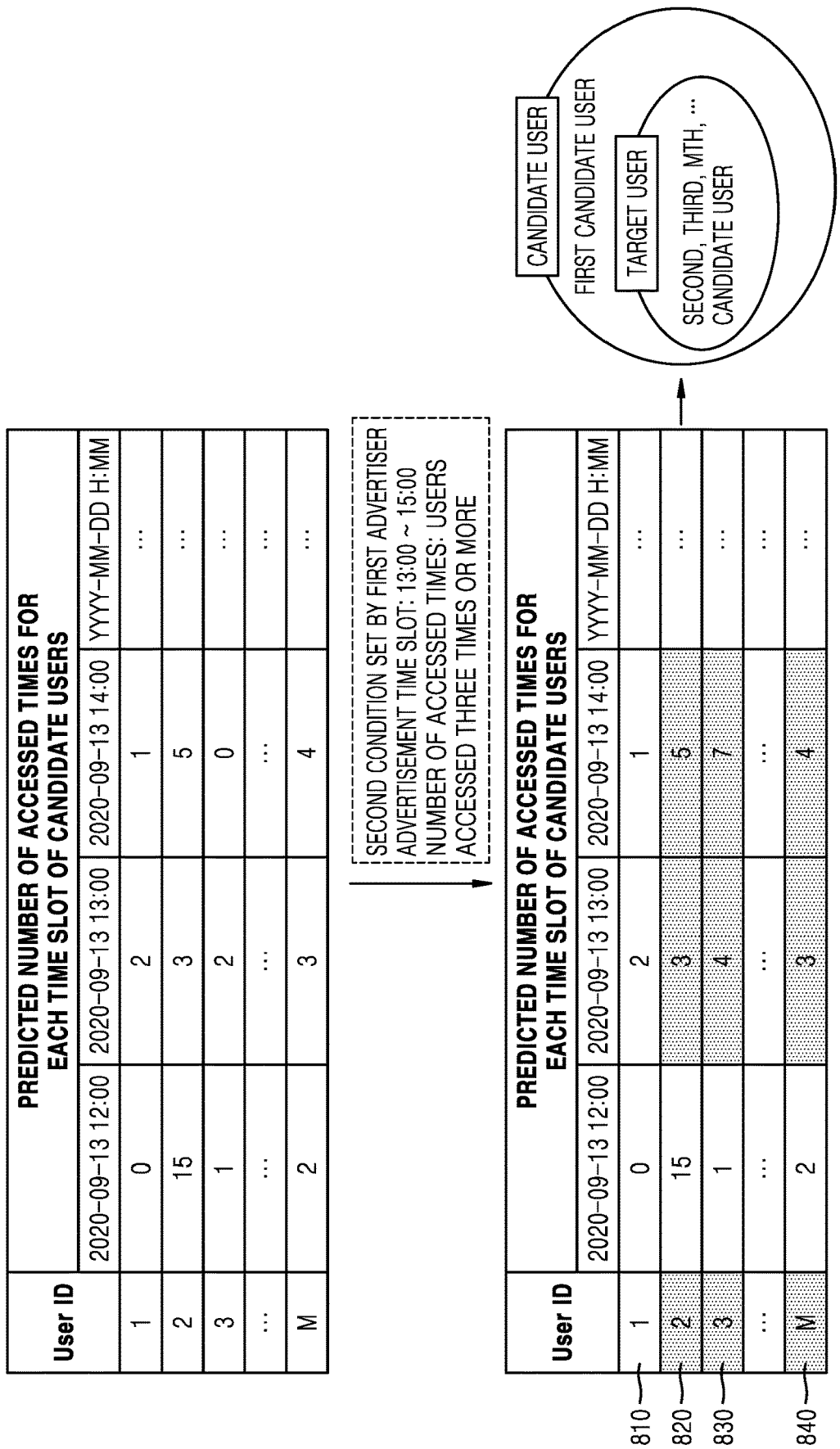
FIG. 8 is a diagram illustrating a method, performed by a server, of selecting target users to be provided with an advertisement of an advertiser among candidate users, according to an embodiment of the disclosure.

FIG. 8 is a diagram illustrating a method, performed by a server, of selecting target users to be provided with an advertisement of an advertiser among candidate users, according to an embodiment of the disclosure.

Referring to FIG. 8, the server 2000 according to an embodiment of the disclosure may select the target users to be provided with the advertisement of the first advertiser 110 among the candidate users, based on the access time of the candidate users predicted by the access time prediction module 2310.

The server 2000 according to an embodiment of the disclosure may obtain advertisement strategy information 620 including a plurality of conditions for exposing the advertisement on the ad impression server 140 from the first advertiser 110. In this case, the plurality of conditions included in the advertisement strategy information 620 may include, for example, clients for advertisement, the time slot for advertisement, the period of advertisement, an average number advertisement impressions, and the like.

The server 2000 according to an embodiment of the disclosure may select the target users to be provided with the advertisement of the advertiser among the candidate users, based on a second condition, which is a condition regarding the time slot for advertisement by the advertiser among the plurality of conditions included in the advertisement strategy information 620.

According to an embodiment of the disclosure, when the second condition regarding the time slot for advertisement by the first advertiser 110 is a user accessing the ad impression server 140 at least three times in the time slot of 13:00~15:00, the server 2000 may search for users satisfying the second condition based on the predicted access time of the candidate users. The server 2000 may select the candidate users predicted to access the ad impression server 140 at least three times in the time slot of 13:00~15:00 as the target user, based on a result of the searching. For example, the second candidate user 820, the third candidate user 830, and the $m^{th}$ candidate user 840 of FIG. 8 satisfy the second condition of the first advertiser 110, and the first candidate user 810 does not satisfy the second condition of the first advertiser 110. In this case, the server 2000 may select the second candidate user 820, the third candidate user 830, and the $m^{th}$ candidate user 840 as the target user.

Figure 9:
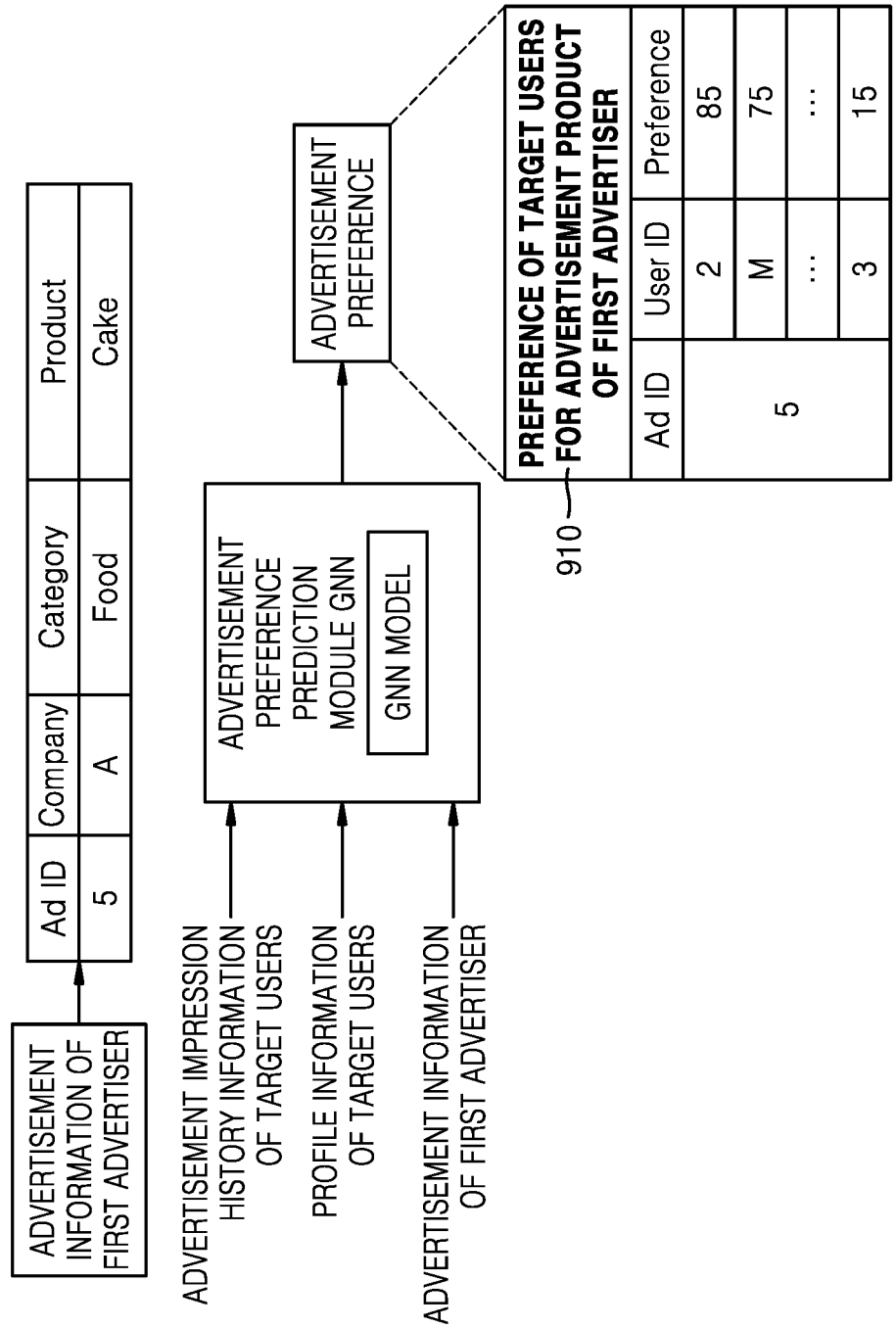
FIG. 9 is a diagram illustrating a method, performed by a server, of predicting preferences of target users for an advertisement of an advertiser, according to an embodiment of the disclosure.

FIG. 9 is a diagram illustrating the method, performed by the server 2000, of predicting the preferences of the target users for the advertisement of the advertiser, according to an embodiment of the disclosure.

Referring to FIG. 9, the second candidate user 820, the third candidate user 830, and the $m^{th}$ candidate user 840 selected as the target user in FIG. 8 will be referred to as the target user. For example, the second candidate user 820 selected as the target user will be referred to as the second target user, and the third candidate user 830 selected as the target user will be referred to as the third target user.

Referring to FIG. 9, the server 2000 according to an embodiment of the disclosure may obtain the preference of each target user to be provided with the advertisement of the advertiser for the product of the advertisement for exposure by the advertiser, by using the advertisement preference prediction module 2320.

According to an embodiment of the disclosure, the server 2000 may obtain the preference of the target users for the cake, which is the advertisement product of the first advertiser 110. The server 2000 may input the advertisement impression history information 410 and the profile information 640 of the target users, and the advertisement information 610 of the first advertiser 110 to the second artificial intelligence model, thereby obtaining the preference of each target user for the cake, which is the advertisement product of the first advertiser 110.

In this case, the second artificial intelligence model may be a graph neural network (GNN) model, but is not limited thereto. A graph of the GNN is a set of structured information including a plurality of nodes and edges connecting the nodes, wherein each of the nodes may be connected through an edge.

According to an embodiment of the disclosure, a node value corresponding to the node may indicate an entity or property, and an edge value corresponding to the edge may indicate a relation. The graph neural network may update (learn) the state of each of the nodes by using the connection relationship between the nodes and the state of the neighboring nodes, and may output a calculation result of the GNN through the most recent state.

According to an embodiment of the disclosure, the graph neural network may be trained to predict the preference for the advertisement product of the first advertiser 110 with the advertisement impression history information 410 of the target users, the profile information 640 of the target users, and the advertisement information 610 of the first advertiser 110 as the input value. For example, the relation between the target users and the advertisements may be trained based on information of the advertisements exposed to the target users in the past and information indicating whether the target user clicked the advertisement exposed to oneself.

The server 2000 according to an embodiment of the disclosure may identify the advertisements preferred by the target user, based on the advertisement nodes connected to the node of the target user.

The server 2000 may identify the advertisement nodes connected to the node of the second target user in the GNN, thereby identifying the advertisements preferred by the second target user. The server 2000 may obtain the preference of the second target user, which is a quantified degree of preference of the second target user for the advertisement product of the first advertiser 110 by comparing information about the advertisements preferred by the identified second target user with the advertisement information 610 of the first advertiser 110.

For example, the preference of the second target user for the advertisement product cake of the first advertiser 110 may be 85 points. In addition, the preference of the $m^{th}$ target user for the advertisement product cake of the first advertiser 110 may be 75 points. In addition, the preference of the third target user for the advertisement product cake of the first advertiser 110 may be 15 points.

In the same manner, the server 2000 may obtain preferences of target users indicating the degree of preference of each of the target users for the advertisement product of the first advertiser 110, with respect to each of the selected target users. In addition, the server 2000 may obtain the preference indicating the degree of preference, of each of the target users for the advertisement product of each advertiser, with respect to each of the advertisements of the second advertiser 120 to the nth advertiser 130.

The server 2000 according to an embodiment of the disclosure may list the preferences of the target users selected with respect to the advertisement (Ad DI: 5) of the first advertiser 110, thereby generating a preference list 910 of the target users.

In addition, referring to FIG. 9, although an embodiment of obtaining the preference of the target user, performed by the advertisement preference prediction module 2320 by using the GNN model was described, the method of obtaining the preference of the target user is not limited thereto.

For example, the server 2000 may obtain the preferences of the target users indicating the degree of preference of each of the target users for the advertisement product of the advertiser, by suing a collaborative filtering (CF) model or a content-based filtering (CBF) model.

The server 2000 according to an embodiment of the disclosure may generate the user-ad matching list 100 by matching the advertisement of the advertiser with the target users, based on the obtained preferences of the target users.

Figure 10A:
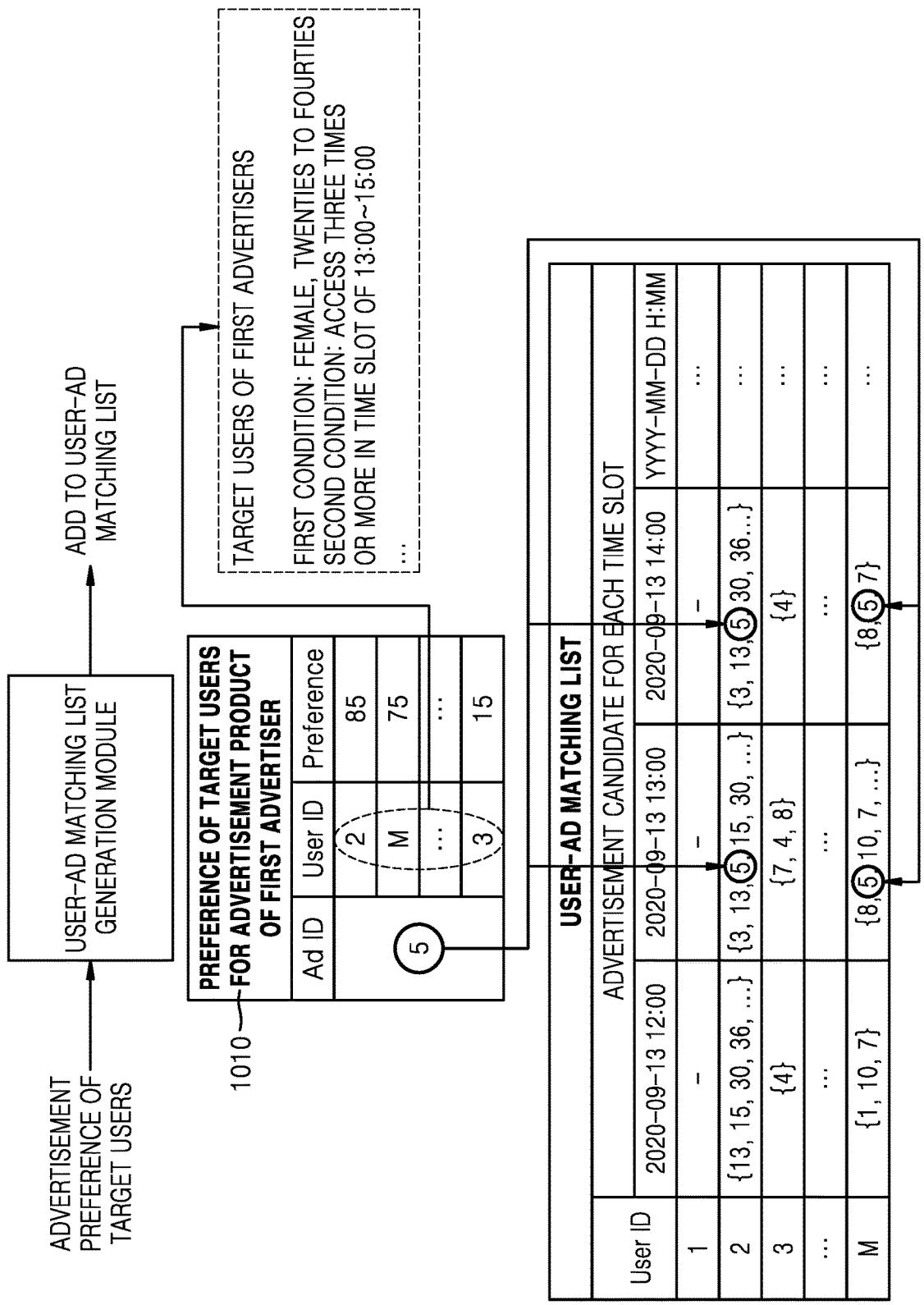
FIG. 10A is a diagram illustrating a method of generating part of a user-ad matching list by matching an advertisement of one advertiser with a plurality of target users when a server generates the user-ad matching list according to an embodiment of the disclosure.

FIGS. 10A and 10B are diagrams illustrating the method, performed by the server 2000, of generating the user-ad matching list 100, according to an embodiment of the disclosure.

Referring to FIGS. 10A and 10B, in FIG. 10A, the advertisement of the first advertiser 110 being matched with the plurality of users 150, 160, and 170 to generate part of the matching list will be illustrated, and in FIG. 10B, the advertisements of the second advertiser 120 to the nth advertiser 130 being matched with the plurality of users to generate the whole user-ad matching list 100 will be illustrated.

FIG. 10A is a diagram illustrating a method of generating part of a user-ad matching list by matching an advertisement of one advertiser with a plurality of target users when a server generates a user-ad matching list according to an embodiment of the disclosure.

The server 2000 according to an embodiment of the disclosure may generate part of the user-ad matching list 100 by matching the advertisement of the first advertiser 110 with the target users, based on the preference of the target users for the advertisement of the first advertiser 110.

Referring to FIG. 10A, the advertisement (Ad ID:5) of the first advertiser 110 is an advertisement regarding a cake, and the target user of the first advertiser 110 may be the users selected according to the embodiments described above, the users being females in their twenties to forties and predicted to access the ad impression server 140 three or more times in the time slot of 13:00~15:00.

According to an embodiment of the disclosure, the server 2000 may align the target users based on the preferences of the target users for the advertisement product of the first advertiser 110, with respect to each of the target users, thereby generating a preference list 1010 of the target users. The server 2000 may select at least some of the target users, based on the preference list 1010 of the target users.

According to an embodiment of the disclosure, the server 2000 may select all of the target users to match the advertisement of the first advertiser 110 with the users 150, 160, and 170. In this case, the server 2000 may add the Ad ID of the of the first advertiser 110 to the advertisement candidate for each time slot of the target user in the user-ad matching list 100, with respect to each of all the selected target users.

According to an embodiment of the disclosure, the server 2000 may select some of the target users to match the advertisement of the first advertiser 110 with the users 150, 160, and 170.

According to an embodiment of the disclosure, the server 2000 may select some of the target users based on whether the preference for the advertisement of the first advertiser 110 is greater than or equal to a certain threshold value, and match the advertisement (Ad ID: 5) of the first advertiser 110 with the target users whose preference is above a certain threshold value.

For example, when the previously set threshold value is 50, the server 2000 may select some of the target users among the target users in the preference list 1010 of the target users based on whether the preference for the advertisement product of the first advertiser 110 is greater than or equal to 50. In this case, some selected target users may be the second target user having a preference of 85 and the $m^{th}$ target user having a preference of 75.

The server 2000 may add the Ad ID (for example, Ad ID:5) of the first advertiser 110 to the advertisement candidates in the time slot of 13:00~14:00 and in the time slot of 14:00~15:00 among the advertisement candidates for each time slot of the second target user in the user-ad matching list 100.

The server 2000 may add the Ad ID (for example, Ad ID:5) of the of the first advertiser 110 to the advertisement candidates in the time slot of 13:00~14:00 and at the slot period of 14:00~15:00 among the advertisement candidates for each time slot of the $m^{th}$ target user in the user-ad matching list 100.

In addition, because the preference of the third target user is 15, the server 2000 may not add the Ad ID of the first advertiser 110 to the advertisement candidate for each time slot of the third target user.

According another embodiment of the disclosure, the server 2000 may obtain the budget value for the advertisement of the first advertiser 110, select some of the target users within the number of the budget range to execute the advertisement within the advertisement budget of the first advertiser 110, and match the advertisement (Ad ID: 5) of the first advertiser 110 with the selected target users.

For example, when the advertisement budget of the first advertiser 110 is an amount that may expose advertisements to 1000 target users, the server 2000 may select 1000 target users with the highest preferences, which are some of the target users in the target user preference list 1010. In this case, the second target user and the $m^{th}$ target user having high preferences may be in the 1000 target users selected in order of preference.

The server 2000 may add the Ad ID (for example, Ad ID:5) of the first advertiser 110 to the advertisement candidates in the time slot of 13:00~14:00 and in the time slot of 14:00~15:00 among the advertisement candidates for each time slot of the second target user in the user-ad matching list 100, and add the Ad ID (for example, Ad ID:5) of the first advertiser 110 to the advertisement candidates in the time slot of 13:00~14:00 and in the time slot of 14:00~15:00 among the advertisement candidates for each time slot of the $m^{th}$ target user in the user-ad matching list 100.

In addition, the 1000 target users selected within the advertisement budget of the first advertiser 110 may have been predicted to access the ad impression server 140 in the future by the access time prediction module 2310, but may not actually access the ad impression server 140. Therefore, when some of the selected target users do not access the ad impression server 140 and are not exposed to the advertisement of the first advertiser 110, the server 2000 may select preliminary target users to further execute the advertisement within the budget of the first advertiser 110. In this case, the server 2000 may select the third target user who did not fit into the 1000 target users due to not having a high preference as the preliminary target user. The server 2000 may select target users within a certain multiple of the number of users targetable by advertising within the advertisement budget of the advertiser in the target user list aligned in order of preference, and the number of target users exceeding one multiple may be selected as preliminary target users.

Although not illustrated in FIG. 10A, the server 2000 may add the Ad ID of the first advertiser 110 to the advertisement candidates in the time slot of 13:00~14:00 and in the time slot of 14:00~15:00 among the advertisement candidates for each time slot of the third target user in the user-ad matching list 100, with respect to the third target user selected as the preliminary target user.

FIG. 10B is a diagram illustrating a method of generating a user-ad matching list by matching target users with a remaining advertisement of advertisers in a same manner as described in FIG. 10A when a server generates a user-ad matching list according to an embodiment of the disclosure.

The server 2000 according to an embodiment of the disclosure may match the advertisement of other advertisers in the same manner as the method of matching the advertisement of the first advertiser 110 with the target users according to the embodiments described in FIGS. 6 to 9.

As a result of obtaining, by the server 2000 according to an embodiment of the disclosure, the preference of each of the target users for the advertisement of the plurality of advertisers 110, 120, and 130 with respect to each of the advertisers 110, 120, and 130 according to the embodiments described above in FIGS. 6 to 9, the server 2000 may obtain a preference 1020 for each advertisement of the plurality of advertisers 110, 120, and 130 with the second user 160 as the target user. In this case, the preference for each advertisement of the second user 160 may include at least the User ID of the second user 160, the Ad ID, the preference, and advertisement time slot information.

The server 2000 according to an embodiment of the disclosure may add the Ad ID of the plurality of advertisers 110, 120, and 130 to the advertisement candidates for each time slot of the second user 160 in the user-ad matching list 100 based on the preference for each advertisement of the second user 1020.

According to an embodiment of the disclosure, the server 2000 may add the Ad ID to each time slot, with respect to the items of the advertisement candidate for each time slot of Sep. 13, 2020. In this case, for the plurality of advertisements included in the preference 1020 for each advertisement of the second user 160, the second user 160 may be selected as the target user for the advertisement of the advertiser according to the embodiments described above.

For example, for the advertisements (Ad ID: 13, 15, 30, and 36) to be advertised in an advertisement time slot of 12:00~13:00, the Ad ID may be added to the advertisement candidate in the time slot of 12:00~13:00 of the second user 160 in order of preference. In addition, for the advertisements (Ad ID: 3, 13, 5, 15, and 30) to be advertised in an advertisement time slot of 13:00~14:00, the Ad ID may be added to the advertisement candidate in the time slot of 13:00~14:00 of the second user 160 in order of preference. In addition, for the advertisements (Ad ID: 3, 13, 5, and 30) to be advertised in an advertisement time slot of 14:00~15:00, the Ad ID may be added to the advertisement candidate in the time slot of 14:00~15:00 of the second user 160 in order of preference.

The server 2000 according to an embodiment of the disclosure may repeat the methods of identifying and matching the target users for each of the plurality of advertisers 110, 120, and 130 described above, thereby generating the user-ad matching list 100 wherein the advertisements of the plurality of advertisers 110, 120, and 130 are matched with the plurality of users 150, 160, and 170 in order of preference.

FIG. 11 is a diagram illustrating a method, performed by a server, of receiving an advertisement request from an ad impression server and providing customized advertisements, according to an embodiment of the disclosure.

Referring to FIG. 11, a server 2000 according to an embodiment of the disclosure may, after the user-ad matching list 100 described above is generated, when one of the target users accesses the ad impression server 140, expose the advertisement to the user based on the generated user-ad matching list 100.

According to an embodiment of the disclosure, operation S1110 may be performed after operation S370 of FIG. 3 is performed.

In operation S1110, the server 2000 according to an embodiment of the disclosure may receive the profile information 430 of the user who accessed a medium including information about the advertisement space and the advertisement space.

In operation S1120, the server 2000 according to an embodiment of the disclosure may identify the User ID of the user who accessed the ad impression server 140. The server 2000 may receive, from the ad impression server 140, the profile information 430 of the user who accessed the ad impression server 140, and identify the User ID included in the profile information 430.

In operation S1130, the server 2000 according to an embodiment of the disclosure may retrieve, from the user-ad matching list 100 stored in the database 2350 of the server 2000, the advertisement candidates corresponding to the User ID of the user who accessed the ad impression server 140, based on the profile information 430 of the user who accessed the ad impression server 140. The server 2000 may retrieve the advertisement candidates corresponding to the access time of the user who accessed the ad impression server 140 from the item of advertisement candidates for each time slot in the user-ad matching list 100 stored in the database 2350 of the server 2000, based on the access time of the user who accessed the ad impression server 140.

In operation S1140, the server 2000 according to an embodiment of the disclosure may select the advertisement to be provided among the advertisement candidates in the matching list, by using at least part of the number of times the advertisement has been provided to the user who accessed the ad impression server 140 so far, the preference of the user for the advertisements in the matching list, and the budget of the advertiser.

According to an embodiment of the disclosure, among the plurality of conditions included in the advertisement strategy information 620 of the advertiser, an exposure frequency condition on whether the advertisement of the advertiser needs to be frequently exposed may be included. The server 2000 may select the advertisement to be provided to the user who accessed the ad impression server 140 among the advertisement candidates in the matching list, based on the number of times the advertisement has been provided to the user who accessed the ad impression server 140 so far, to satisfy the exposure frequency condition of the advertisement of the advertiser.

According another embodiment of the disclosure, the server 2000 may select the advertisement to be provided to the user who accessed the ad impression server 140 among the advertisement candidates in the matching list, based on the preference of the user for the advertisements in the matching list. The server 2000 may select the advertisement to be provided to the user who accessed the ad impression server 140 among the advertisement candidates in the matching list, so that the advertisement is provided in order of preference for the advertisement product of the advertiser based on the preference for each advertisement of the plurality of advertisers 110, 120, and 130 with the users who accessed the ad impression server 140 as the target user.

According another embodiment of the disclosure, the server 2000 may select the advertisement to be provided to the user who accessed the ad impression server 140 among the advertisement candidates in the matching list based on the advertisement budget of the advertiser. For example, when the user accessed the ad impression server 140, the preference of the user for the advertisement product of first advertiser 110 may be higher than the preference of the user for the advertisement product of second advertiser 120, but the advertisement budget of the first advertiser 110 may have been exhausted. In this case, when selecting the advertisement to be provided to the user, the server 2000 may not select the advertisement of the first advertiser 110 and select the advertisement of the second advertiser.

The server 2000 according to an embodiment of the disclosure may transmit the advertisement selected to be provided to the user who accessed the ad impression server 140 to the ad impression server 140. A method, performed by the server 2000, of providing the advertisement based on the user-ad matching list 100 according to the access by the user to the ad impression server 140, will be described with reference to FIGS. 12A and 12B.

Figure 12A:
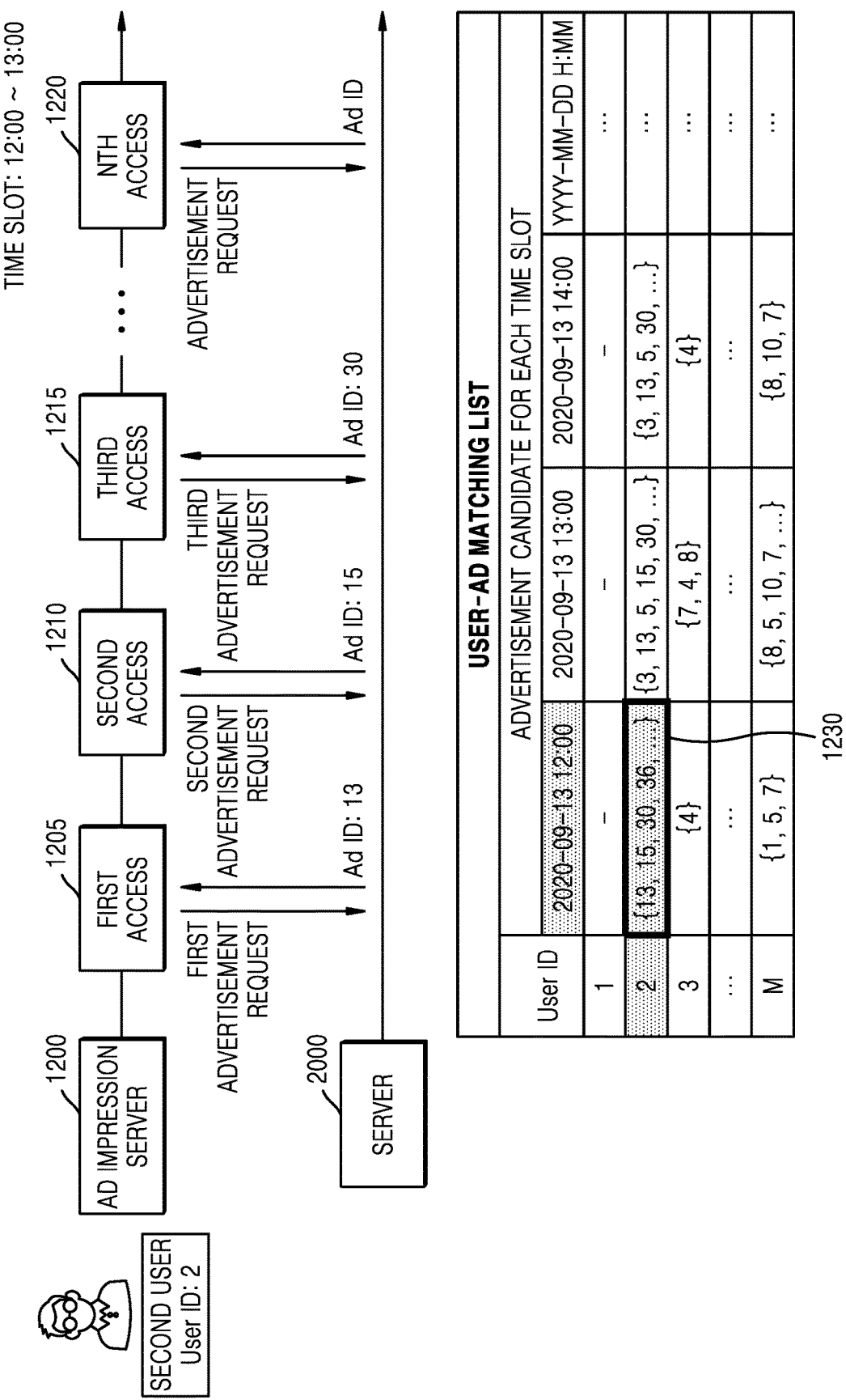
FIG. 12A is a diagram illustrating a method, performed by a server, of providing advertisements of a plurality of advertisers to a second user when the second user of a user-ad matching list accesses an ad impression server in a time slot of 12:00~13:00 according to an embodiment of the disclosure.
Figure 12B:
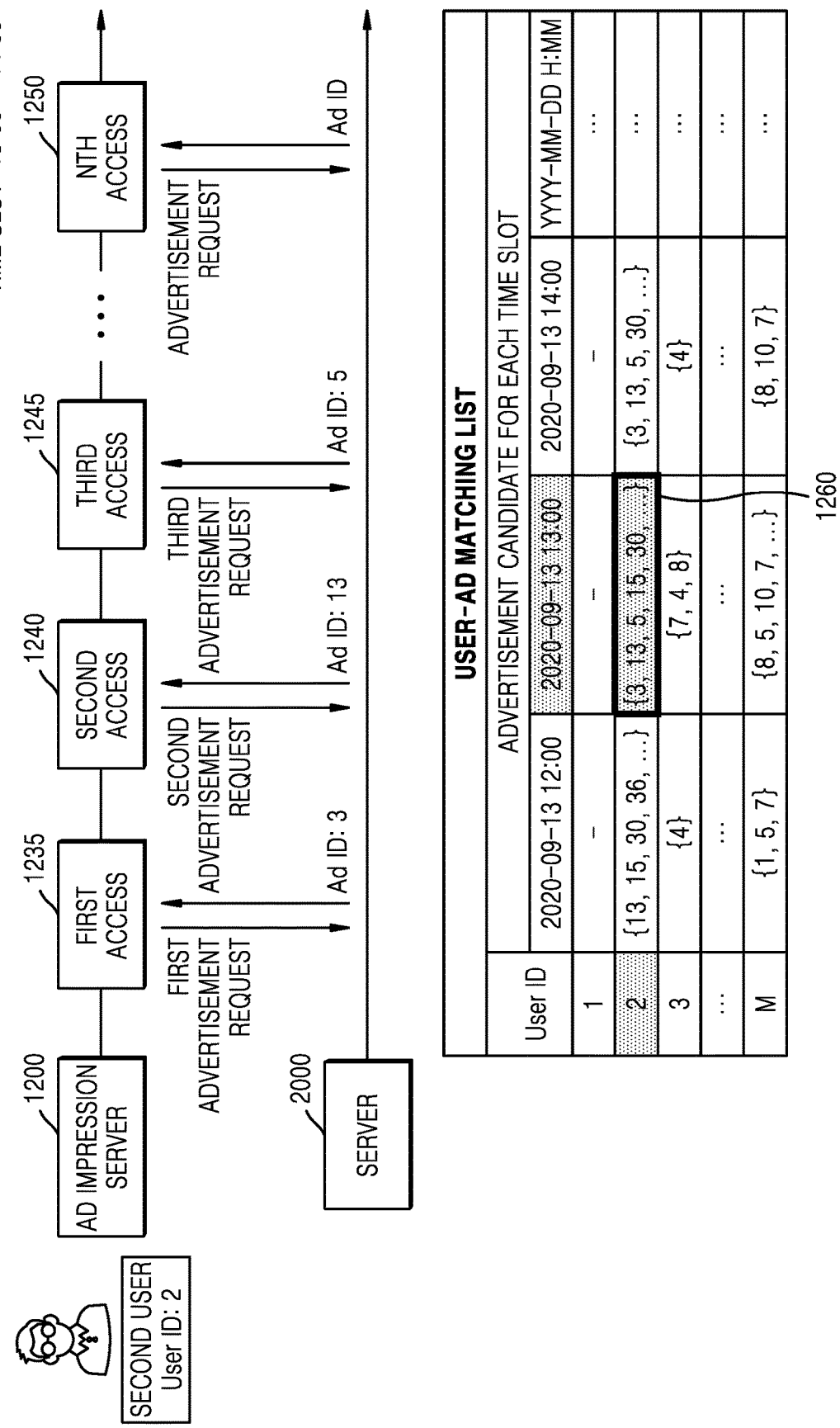
FIG. 12B is a diagram illustrating a method, performed by a server, of providing an advertisement of a plurality of advertisers to a second user when the second user of a user-ad matching list accesses an ad impression server at a time slot that is different from FIG. 12A, that is, the time slot of 14:0~15:00 according to an embodiment of the disclosure.

FIGS. 12A and 12B are diagrams illustrating a method, performed by the server 2000, of providing the advertisement according to the access by the user for each time slot based on the user-ad matching list 100, according to an embodiment of the disclosure.

FIG. 12A is a diagram illustrating a method, performed by a server, of providing advertisements of a plurality of advertisers to a second user when a second user of a user-ad matching list accesses an ad impression server in a time slot of according to an embodiment of the disclosure.

The ad impression server 1200 may transmit an advertisement request to the server 2000 to display the advertisement in the advertisement space provided by the ad impression server 1200 when the user accesses the ad impression server 1200. The server 2000 may transmit the advertisement information 420 including the Ad ID to be provided to the second user 160 to the ad impression server 1200, in accordance with the advertisement request from the ad impression server 1200, thereby exposing the advertisement to the user.

According to an embodiment of the disclosure, a second user 160 among the plurality of users 150, 160, and 170 of the ad impression server 1200 may access the ad impression server 1200. In this case, the second user 160 may access the ad impression server 1200 several times at a predetermined time slot. When the second user 160 accesses the ad impression server 1200, the ad impression server 1200 may transmit the advertisement request according to the access by the second user 160 to the server 2000. In this case, the advertisement request may include information about the advertisement space of the ad impression server 1200, the profile information 430 of the second user, and access time information of the second user 160.

The server 2000 according to an embodiment of the disclosure may retrieve the advertisement candidates corresponding to the User ID of the second user 160 and the access time information of the second user 160 in the user-ad matching list 100, based on the received advertisement request.

For example, the server 2000 may retrieve the advertisement candidates 1230 corresponding to the User ID (User ID: 2) and the access time information (time slot: 12:00~13:00) of the second user 160 who accessed the ad impression server 1200.

When the second user 160 access the ad impression server 1200 for the first time (a first access 1205) in the time slot of 12:00~13:00, the ad impression server 1200 may transmit a first advertisement request according to the first access 1205 of the second user 160 to the server 2000. The server 2000 may transmit the advertisement corresponding to advertisement identification number 13 (Ad ID: 13) with the highest preference of the second user 160 among the advertisement candidates 1230, based on the first advertisement request.

Next, when the second user 160 accesses the ad impression server 1200 for the second time (a second access 1210) in the time slot of 12:00~13:00, the ad impression server 1200 may transmit the second advertisement request according to the second access 1210 of the second user 160 to the server 2000. The server 2000 may transmit the advertisement corresponding to advertisement identification number 15 (Ad ID: 15) with the second highest preference of the second user 160 among the advertisement candidates 1230, based on the second advertisement request.

In the same manner, the ad impression server 1200 may transmit the advertisement request regarding a third access 1215 to an $n^{th}$ access 1220 after the second access 1210 in which the second user 160 accesses the ad impression server 1200 in the time slot of 12:00~13:00 to the server 2000, and the server 2000 may, in response to each advertisement request, select an advertisement to be exposed to the ad impression server 1200 among the advertisement candidates 1230 in the user-ad matching list 100 based on the preference of the second user 160, and transmit the selected advertisement and the Ad ID of the selected advertisement to the ad impression server 1200.

FIG. 12B is a diagram illustrating a method, performed by a server, of providing an advertisement of a plurality of advertisers to a second user when a second user of a user-ad matching list accesses an ad impression server at a time slot that is different from FIG. 12A, that is, the time slot of 14:00~15:00 according to an embodiment of the disclosure.

Referring to FIG. 12B, the same content as described with respect to FIG. 12A will be omitted.

Referring to FIG. 12B, the server 2000 according to an embodiment of the disclosure may retrieve the advertisement candidates 1260 corresponding to the User ID (User ID: 2) and the access time information (time slot: 13:00~14:00) of the second user 160 who accessed the ad impression server 1200.

When the second user 160 access the ad impression server 1200 for the first time (a first access 1235) in the time slot of 13:00~14:00, the ad impression server 1200 may transmit a first advertisement request according to the first access 1235 of the second user 160 to the server 2000. The server 2000 may transmit the advertisement corresponding to advertisement identification number 3 (Ad ID: 3) with the highest preference of the second user 160 among the advertisement candidates 1260, based on the first advertisement request.

Next, when the second user 160 accesses the ad impression server 1200 for the second time (a second access 1240) in the time slot of 13:00~14:00, the ad impression server 1200 may transmit the second advertisement request according to the second access 1240 of the second user 160 to the server 2000. The server 2000 may transmit the advertisement corresponding to advertisement identification number 13 (Ad ID: 13) with the second highest preference of the second user 160 among the advertisement candidates 1260, based on the second advertisement request.

In the same manner, the ad impression server 1200 may transmit the advertisement request regarding a third access 1245 to an nth access 1250 after the second access 1240 in which the second user 160 accesses the ad impression server 1200 in the time slot of 13:00~14:00 to the server 2000, and the server 2000 may, in response to each advertisement request, select an advertisement to be exposed to the ad impression server 1200 among the advertisement candidates 1260 in the user-ad matching list 100 based on the preference of the second user 160, and transmit the selected advertisement and the Ad ID of the selected advertisement to the ad impression server 1200.

Figure 13:
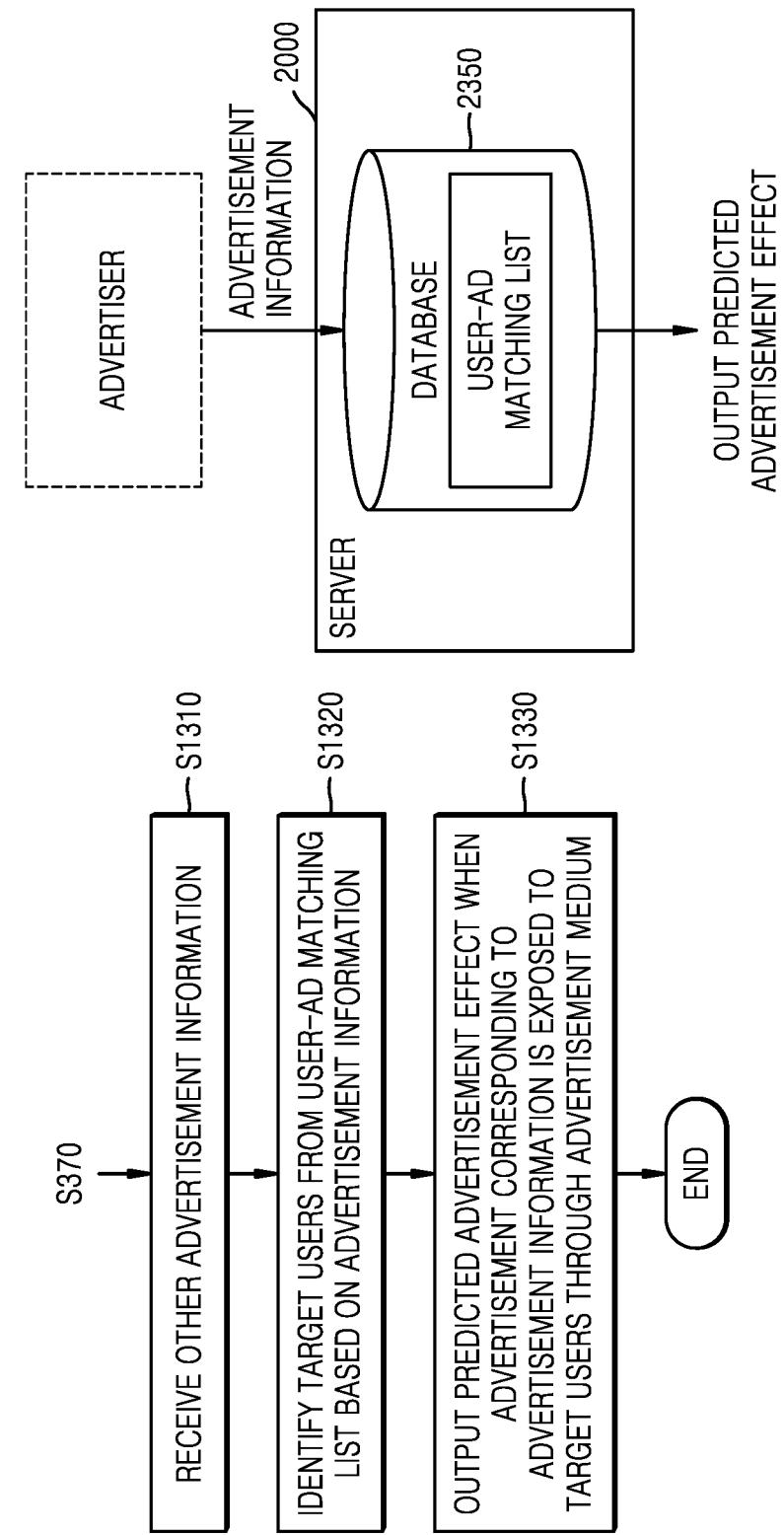
FIG. 13 is a diagram illustrating a method, performed by a server, of receiving other advertisement information and providing an advertisement simulation capable of predicting an advertisement effect with respect to the received advertisement information, according to an embodiment of the disclosure.

FIG. 13 is a diagram illustrating a method, performed by a server, of receiving another advertisement information and providing an advertisement simulation capable of predicting an advertisement effect regarding received advertisement information, according to an embodiment of the disclosure.

Referring to FIG. 13, the server 2000 according to an embodiment of the disclosure may receive the advertisement information from the advertiser after the user-ad matching list 100 described above is generated, and output information indicating a predicted advertisement effect when the advertisement corresponding to the received advertisement information is exposed by the ad impression server 140.

According to an embodiment of the disclosure, operation S1310 may be performed after operation S370 of FIG. 3 is performed.

In operation S1310, the server 2000 according to an embodiment of the disclosure may receive the advertisement information from the advertiser after the user-ad matching list 100 described above is generated. In this case, the advertisement information received by the server 2000 may be the advertisement information matched with the user-ad matching list 100 or a newly received advertisement information, which is not matched to the user-ad matching list 100. In addition, the advertisement information may include information regarding the time slot when the advertiser intends to advertise.

In operation S1320, the server 2000 according to an embodiment of the disclosure may identify the target user to be provided with the advertisement of the advertiser from the user-ad matching list 100, based on the received advertisement information.

For example, when the received advertisement information is a matched advertisement information in the user-ad matching list 100, the server 2000 may identify the target users matched with the advertisement time slot set by the advertiser in the user-ad matching list 100.

As another example, when the received advertisement information is not a matched advertisement information in the user-ad matching list 100, the server 2000 may identify the target users corresponding to the received advertisement information according to the embodiments described above. In this case, the server 2000 may update the user-ad matching list 100 by matching the identified target users with the received advertisement information.

As another example, when the received advertisement information is not a matched advertisement information in the user-ad matching list 100, the server 2000 may identify a similar advertisement with the received advertisement information among the matched advertisements in the user-ad matching list 100, and may identify the target users matched with the time slot set by the advertiser in the user-ad matching list 100 with respect to the identified similar advertisement.

In operation S1330, the server 2000 according to an embodiment of the disclosure may output information indicating the advertisement effect when the advertisement corresponding to the received advertisement information is exposed to the target users through an advertisement medium. In this case, the information indicating the advertisement effect may be a predicted click-through rate (CTR), a predicted conversion rate (CVR), a predicted return on ad spend (ROAS), and a predicted return on invest (ROI), but it is not limited thereto.

The server 2000 according to an embodiment of the disclosure may perform operations S1310 to S1330 described above, thereby providing a simulation, which allows the advertiser to receive the predicted advertisement effect before actually performing the advertisement.

Meanwhile, the block diagram of the server 2000 of FIG. 2 is a block diagram according to an embodiment of the disclosure. Components of the block diagram may be integrated, a component may be added, or a component may be omitted according to the specification of each device that is actually implemented. In other words, two or more components may be integrated into one component or one component may be divided into two or more components when necessary. In addition, a function performed by each block is only for describing embodiments of the disclosure and specific operations or apparatuses do not limit the scope of right of the disclosure.

A method, performed by a server, of generating a user-ad matching list, according to an embodiment of the disclosure, may be recorded on a computer-readable recording medium by being implemented in a form of program commands executed by using various computers. The computer-readable recording medium may include at least one of a program command, a data file, or a data structure. The program commands recorded in the computer-readable recording medium may be specially designed or well known to one of ordinary skill in the computer software field. Examples of the computer-readable recording medium include magnetic media, such as hard disks, floppy disks, and magnetic tapes, optical media, such as CD-ROMs and DVDs, magneto-optical media, such as floptical disks, and hardware devices specially configured to store and perform program commands, such as a read-only memory (ROM), a random-access memory (RAM), and a flash memory. Examples of the computer command include mechanical codes prepared by a compiler, and high-level language codes executable by a computer by using an interpreter.

Furthermore, an operating method of a server, according to the embodiments of the disclosure may be provided by being included in a computer program product. The computer program products are products that can be traded between sellers and purchasers.

The computer program product may include a software program or a computer-readable storage medium storing a software program. For example, the computer program product may include a product (for example, a downloadable application) in a form of a software program that is electronically distributable through a manufacturer of the electronic device or an electronic market (for example, Google PlayStore™ or AppStore). For electronic distribution, at least a part of the software program may be stored in the storage medium or temporarily generated. In this case, the storage medium may be a storage medium of a server of a manufacturer, a server of an electronic market, or a relay server that temporarily stores the software program.

In a system including a server and a client device, the computer program product may include a storage medium of the server or a storage medium of the client device. Alternatively, when there is a third device (for example, a smart phone) communicatively connected to the server or the client device, the computer program product may include a storage medium of the third device. Alternatively, the computer program product may include the S/W program itself, which is transmitted from the server to the client device or the third device or transmitted from the third device to the client device.

In this case, at least one of the server, the client server, or the third device may execute the computer program product and thus perform the method according to disclosed embodiments of the disclosure. Alternatively, two or more of the server, the client server, and the third device may execute the computer program product to perform the method according to disclosed embodiments of the disclosure in a distributed fashion.

For example, the server may execute the computer program stored in the server to control a client device communicably connected to the server to perform the method according to the embodiments of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A method, performed by a server, of generating a user-advertisement (user-ad) matching list for online advertisement, the method comprising:
   receiving, from an ad impression server, profile information of users and advertisement impression history information of the users, wherein, the users are people who have been exposed to a plurality of advertisements through the ad impression server;
   receiving, from a server of a first advertiser, advertisement information regarding an advertisement product and advertisement strategy information including a plurality of conditions for exposing the advertisement;
   identifying candidate users for the advertisement of the first advertiser among the users, based on the profile information of the users and the advertisement strategy information;
   obtaining a predicted access time when the candidate users will access the ad impression server for each time slot having a certain time interval, by inputting the profile information of the candidate users and the advertisement impression history information to a first artificial intelligence model;
   selecting target users to be provided with the advertisement of the first advertiser among the candidate users, based on the predicted access time;
   obtaining a preference of each target user for the advertisement product of the first advertiser by inputting the profile information of the target users, the advertisement impression history information, and the advertisement information to a second artificial intelligence model;
   determining, based on the preference and advertisement budget of the first advertiser, first target users having a high priority and preliminary target users not included in the first target users as second target users;
   matching, based on the preference, the advertisement of the first advertiser with the first target users and the second target users;
   generating the user-ad matching list matched by a plurality of target users and a plurality of advertisers by a time period, wherein, the user-ad matching list includes the first advertiser and the first target users for the first advertiser and the second target user for the first advertiser;
   receiving, from the ad impression server, an advertisement request after the user-ad matching list is generated, wherein, the advertisement request includes profile information of a first user who accessed the ad impression server; and
   transmitting, to the ad impression server, advertisement information in case of the first user is the first target and providing advertisement information after a predetermined time in case of the first user is the second target user.

2. The method of claim 1, wherein the generating of the user-ad matching list comprises adding advertisement identification information of the first advertiser to an advertisement candidate for a time slot of each of the first target users and the second target users of the user-ad matching list, based on the preference.

3. The method of claim 1,
   wherein the identifying of the candidate users comprises, based on a first condition included in the advertisement strategy information and indicating an object for advertisement by the advertiser, and the profile information of the users, identifying users satisfying the first condition among the users as the candidate users, and
   wherein the selecting of the target users comprises, based on a second condition included in the advertisement strategy information and indicating a time slot for advertisement by the advertiser, and the predicted access time, selecting users satisfying the second condition among the candidate users as the target users.

4. The method of claim 1,
   wherein the advertisement impression history information includes access history information generated by counting a number of times each of the candidate users accessed the ad impression server for each time slot at certain intervals, and
   wherein the obtaining of the predicted access time when the candidate users will access the ad impression server comprises predicting the access time when each of the candidate users will access the ad impression server for a certain period by inputting the access history information of each of the candidate users and the profile information of the candidate users to the first artificial intelligence model.

5. The method of claim 1, further comprising:
   selecting some of the first target users as third target users based on a threshold value of the preference for the advertisement product of the advertiser,
   wherein the generating of the user-ad matching list comprises generating the user-ad matching list by matching the advertisement of the advertiser with the third target users.

6. The method of claim 2, wherein the providing of advertisement information to the ad impression server comprising:
   identifying whether the first user that accessed the ad impression server is the first target user or the second target user; and
   selecting an advertisement to be exposed to the first user through the ad impression server in the user-ad matching list.

7. The method of claim 6, wherein the selecting of the advertisement to be exposed to the first user through the ad impression server comprises, based on at least one of the preference of the first user for the advertisements in the user-ad matching list or a number of times the advertisements were provided to the first user, selecting the advertisement to be exposed by the ad impression server.

8. The method of claim 1, further comprising:
receiving advertisement information different from the advertisement information after the user-ad matching list is generated; and
based on the received different advertisement information and the user-ad matching list, when an advertisement corresponding to the different advertisement information is exposed in a medium of the ad impression server, outputting a predicted click-through rate (CTR) and conversion rate (CVR).

9. The method of claim 1,
wherein the first artificial intelligence model is a recurrent neural network (RNN) model, and
wherein the second artificial intelligence model is a graph neural network (GNN) model.

10. A server generating a user-advertisement (user-ad) matching list for online advertisement, the server comprising:
a communication interface comprising communication circuitry configured to perform data communication with an ad impression server;
a storage storing a program including one or more instructions; and
a processor configured to execute the one or more instructions of the program stored in the storage,
wherein the processor is further configured execute the one or more instructions stored in the storage to:
control the communication interface to receive, from the ad impression server, profile information of users and advertisement impression history information of the users, wherein, the users are people who have been exposed to a plurality of advertisements through the ad impression server,
control the communication interface to receive, from a server of a first advertiser, advertisement information regarding an advertisement product and advertisement strategy information including a plurality of conditions for exposing the advertisement;
identify candidate users for the advertisement of the first advertiser among the users based on the profile information of the users and the advertisement strategy information,
obtain a predicted access time when the candidate users will access the ad impression server for each time slot having a certain time interval, by inputting the profile information and the advertisement impression history information of the candidate users to a first artificial intelligence model,
select target users to be provided with the advertisement of the first advertiser among the candidate users, based on the predicted access time,
obtain a preference of each target user for the advertisement product of the first advertiser by inputting the profile information of the target users, the advertisement impression history information, and the advertisement information to a second artificial intelligence model,
determine, based on the preference and advertisement budget of the first advertiser, first target users having a high priority and preliminary target users not included in the first target users as second target users,
match, based on the preference, the advertisement of the first advertiser with the first target users and the second target users,
generate the user-ad matching list matched by a plurality of target users and a plurality of advertisers by a time period, wherein, the user-ad matching list includes the first advertiser and the first target users for the first advertiser and the second target user for the first advertiser,
control the communication interface to receive, from the ad impression server, an advertisement request after the user-ad matching list is generated, wherein, the advertisement request includes profile information of a first user who accessed the ad impression server, and
control the communication interface to transmit, to the ad impression server, advertisement information in case of the first user is the first target and providing advertisement information after a predetermined time in case of the first user is the second target user.

11. The server of claim 10, wherein the processor is further configured to execute the one or more instructions stored in the storage to add advertisement identification information of the first advertiser to an advertisement candidate for a time slot of each of the first target users and the second target users of the user-ad matching list, based on the preference.

12. The server of claim 10, wherein the processor is further configured to execute the one or more instructions stored in the storage to:
identify users satisfying the first condition among the users as the candidate users based on a first condition included in the advertisement strategy information and indicating an object for advertisement by the advertiser, and the profile information of the users, and
select users satisfying the second condition among the candidate users as the target users based on a second condition included in the advertisement strategy information and indicating a time slot for advertisement by the advertiser, and the predicted access time.

13. The server of claim 10,
wherein the advertisement impression history information includes access history information generated by counting a number of times each of the candidate users accessed the ad impression server for each time slot at certain intervals, and
wherein the processor is further configured to:
execute the one or more instructions stored in the storage to obtain the predicted access time when each of the candidate users will access the ad impression server for a certain period by inputting the access history information of each of the candidate users and the profile information of the candidate users to the first artificial intelligence model.

14. The server of claim 10, wherein the processor is further configured to execute the one or more instructions stored in the storage to:
select some of the first target users as third target users based on a threshold value of the preference for the advertisement product of the advertiser, and
generate the user-ad matching list by matching the advertisement of the advertiser with the third target users.

15. The server of claim 11, wherein the processor is further configured to execute the one or more instructions stored in the storage to:
identify whether the first user that accessed the ad impression server is the first target user or the second target user, and
select an advertisement to be exposed to the first user through the ad impression server in the user-ad matching list.

16. The server of claim 15, wherein the processor is further configured to execute the one or more instructions stored in the storage to:
- based on at least one of the preference of the first user for the advertisements in the user-ad matching list or a number of times the advertisements were provided to the first user, and
- select the advertisement to be exposed by the ad impression server.

17. The server of claim 10, wherein the processor is further configured to execute the one or more instructions stored in the storage to:
- receive advertisement information different from the advertisement information after the user-ad matching list is generated, and
- based on the received different advertisement information and the user-ad matching list, when an advertisement corresponding to the different advertisement information is exposed in a medium of the ad impression server, output a predicted click-through rate (CTR) and conversion rate (CVR).

18. At least one non-transitory computer-readable recording medium having recorded thereon a program for executing the method of claim 1, on a computer.

* * * * *